US011258401B2

(12) United States Patent
Grossman et al.

(10) Patent No.: US 11,258,401 B2
(45) Date of Patent: Feb. 22, 2022

(54) SOLAR MODULE CLEANER

(71) Applicant: NOVASOURCE POWER OPCO, INC., Wilmington, DE (US)

(72) Inventors: Marc Grossman, Davis, CA (US); Devin Cameron Castellucci, Woodland, CA (US); Cedric Jeanty, Davis, CA (US); Juan Sanchez-Garcia, Woodland, CA (US); Erik Cummins, Sacramento, CA (US)

(73) Assignee: NOVASOURCE POWER OPCO, INC., Wilmington, DE (US)

( * ) Notice: Subject to any disclaimer, the term of this patent is extended or adjusted under 35 U.S.C. 154(b) by 0 days.

(21) Appl. No.: 16/117,802

(22) Filed: Aug. 30, 2018

(65) Prior Publication Data

US 2019/0013775 A1    Jan. 10, 2019

Related U.S. Application Data

(62) Division of application No. 14/339,370, filed on Jul. 23, 2014, now abandoned.
(Continued)

(51) Int. Cl.
| | |
|---|---|
| *H02S 40/10* | (2014.01) |
| *F24S 25/00* | (2018.01) |
| *F24S 40/20* | (2018.01) |
| *B08B 1/00* | (2006.01) |
| *B08B 3/02* | (2006.01) |

(Continued)

(52) U.S. Cl.
CPC .............. *H02S 40/10* (2014.12); *B08B 1/001* (2013.01); *B08B 1/002* (2013.01); *B08B 1/005* (2013.01); *B08B 1/006* (2013.01); *B08B 3/024* (2013.01); *B08B 3/04* (2013.01); *F24S 25/00* (2018.05); *F24S 40/20* (2018.05); *B08B 1/04* (2013.01); *Y02E 10/40* (2013.01)

(58) Field of Classification Search
None
See application file for complete search history.

(56) References Cited

U.S. PATENT DOCUMENTS

| | | |
|---|---|---|
| 2004/0168709 A1 | 9/2004 | Drumm |
| 2008/0035754 A1 | 2/2008 | Aruga |
| | (Continued) | |

FOREIGN PATENT DOCUMENTS

| | | |
|---|---|---|
| CN | 101567398 A | 10/2009 |
| CN | 101782285 A | 7/2010 |
| | (Continued) | |

OTHER PUBLICATIONS

English Machine Translation of WO2014013767.*
(Continued)

*Primary Examiner* — Mikhail Kornakov
*Assistant Examiner* — Pradhuman Parihar
(74) *Attorney, Agent, or Firm* — Christopher R. Carroll; The Small Patent Law Group LLC

(57) ABSTRACT

A photovoltaic (PV) module cleaning system can include a robotic cleaning device and a support system. The support system can be configured to provide a metered fill to the robotic cleaning device. In some embodiments, the robotic cleaning device and include a curved cleaning head. Various techniques for deploying a robotic cleaning device on PV modules include out-and-back, leapfrog, among others.

17 Claims, 16 Drawing Sheets

Related U.S. Application Data

(60) Provisional application No. 62/007,381, filed on Jun. 3, 2014.

(51) Int. Cl.
   B08B 3/04 (2006.01)
   B08B 1/04 (2006.01)

(56) References Cited

U.S. PATENT DOCUMENTS

| | | |
|---|---|---|
| 2009/0223539 A1 | 9/2009 | Gibbel |
| 2011/0094542 A1 | 4/2011 | Gonzalez |
| 2011/0120502 A1 | 5/2011 | Anapolsky |
| 2011/0180113 A1 | 7/2011 | Chien |
| 2012/0103408 A1* | 5/2012 | Moslehi .......... H01L 31/022441 136/256 |
| 2012/0125365 A1 | 5/2012 | Ike |
| 2013/0102109 A1* | 4/2013 | Stewart ............ H01L 31/02167 438/98 |
| 2015/0244311 A1 | 8/2015 | Nakagawa |
| 2015/0280644 A1 | 10/2015 | Gostein et al. |

FOREIGN PATENT DOCUMENTS

| | | | |
|---|---|---|---|
| CN | 102343344 | | 2/2012 |
| CN | 102355960 A | | 2/2012 |
| CN | 102446982 A | | 5/2012 |
| DE | 10 2010 006 531 A1 | | 8/2011 |
| DE | 10 2010 014 790 A1 | | 10/2011 |
| EP | 2 557 375 A1 | | 2/2013 |
| JP | 7-281752 A | | 10/1995 |
| JP | 2000-250452 A | | 9/2000 |
| JP | 2010-155308 A | | 7/2010 |
| KR | 10-2009-0006908 | | 1/2009 |
| KR | 10-2009-0058624 | | 6/2009 |
| KR | 10-2010-0087416 | | 8/2010 |
| KR | 10-1034192 B1 | | 5/2011 |
| KR | 10-1336077 B1 | | 12/2013 |
| WO | WO 2014/013767 A1 | | 1/2014 |
| WO | WO 2014013767 A1 | | 1/2014 |
| WO | WO-2014013767 A1 * | 1/2014 | .............. B08B 1/04 |
| WO | WO 2014/081967 A1 | | 5/2014 |

OTHER PUBLICATIONS

International Search Report and Written Opinion dated Sep. 1, 2015 in PCT/US2015/033785.
International Preliminary Report on Patentability and Written Opinion dated Feb. 28, 2017 in PCT/US2015/033785.
Saudi Arabian Office Action dated Apr. 18, 2017 in Patent Application No. 516371714.
Office Action dated Sep. 19, 2017 in Japanese Patent Application No. 2016-547183 (with unedited computer generated English translation).
Partial Supplementary European Search Report dated Oct. 5, 2017 in Patent Application No. 15802367.1.
Extended European Search Report dated Jan. 8, 2018 in Patent Application No. 15802367.1, 11 pages.
Office Action dated Feb. 27, 2018 in Japanese Patent Application No. 2016-547183, with English-language Translation, 9 pages.
Office Action dated Apr. 5, 2018 in Chilean Patent Application No. 201603091, 12 pages.
Office Action dated Jul. 2, 2018 in Chinese Patent Application No. 201580010481.7, with English-language translation, 12 pages.

\* cited by examiner

SOLAR MODULE CLEANER

CROSS REFERENCE TO RELATED APPLICATION

This application is a divisional of U.S. patent application Ser. No. 14/339,370 filed Jul. 23, 2014, which claims the benefit of U.S. Provisional Application No. 62/007,381 filed Jun. 3, 2014, entitled "Solar Module Cleaner" by Grossman et al., the entire contents of both of which are hereby incorporated by reference.

BACKGROUND

Photovoltaic (PV) cells, commonly known as solar cells, are known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of, and entering into, the substrate creates electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit. Solar cells can be coupled together electrically (e.g., in series) to form a solar, or PV, module.

In the field, PV modules can collect dust, dirt, or other particulates, which can block some amount of solar radiation, which can ultimately reduce the amount of energy produced by the PV module.

DETAILED DESCRIPTION

Figure 1:
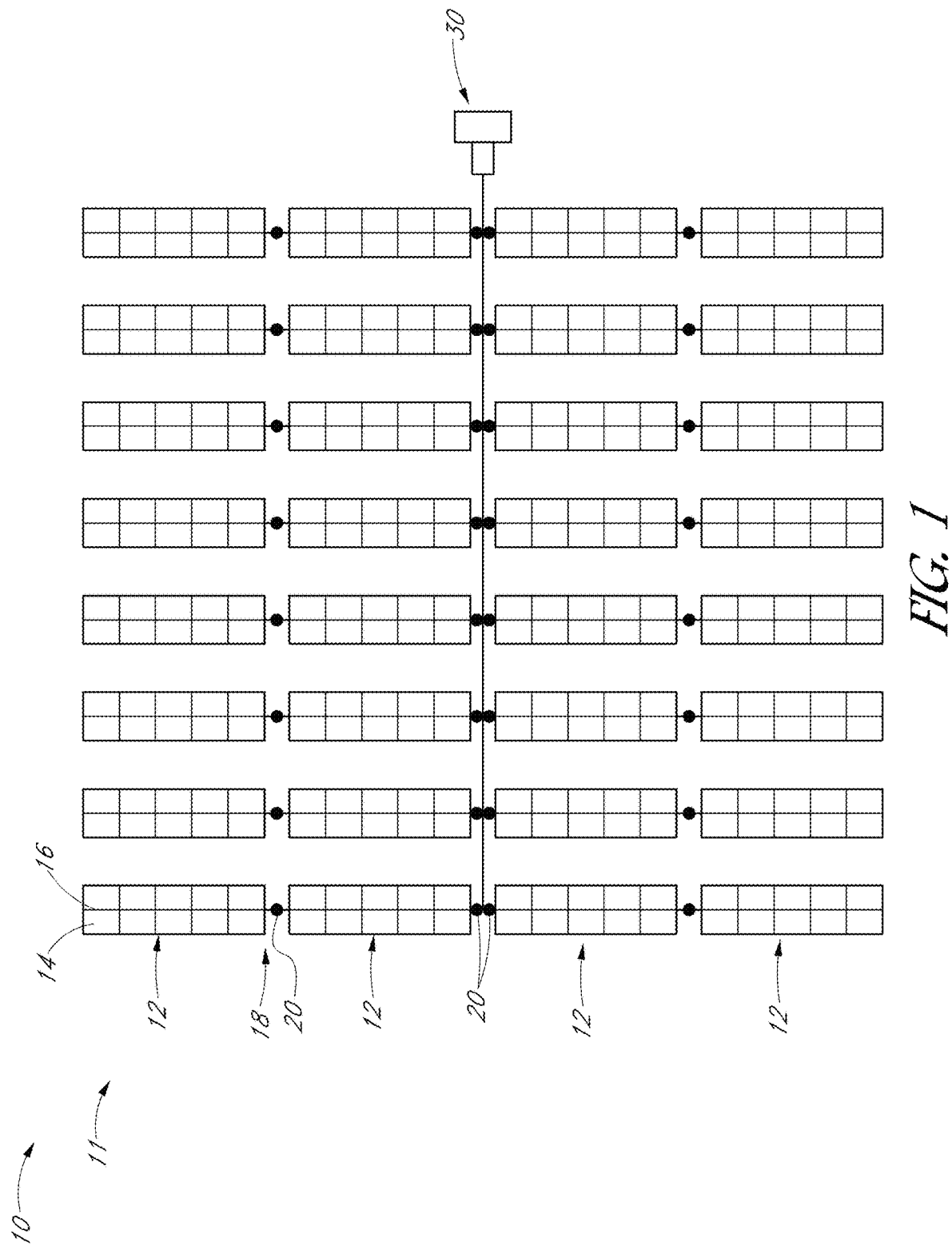
FIG. 1 is a schematic top plan view of a solar collector system, according to some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" drive module of a PV module cleaner does not necessarily imply that this drive module is the first drive module in a sequence; instead the term "first" is used to differentiate this drive module from another drive module (e.g., a "second" drive module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or, eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

A PV module robotic cleaner and methods of operating a robotic cleaner are described herein. In the following description, numerous specific details are set forth, such as specific structures and operations, in order to provide a thorough understanding of embodiments of the present disclosure. It will be apparent to one skilled in the art that embodiments of the present disclosure may be practiced without these specific details. In other instances, well-known structures or techniques are not described in detail in order to not unnecessarily obscure embodiments of the present disclosure. Moreover, some details of a robotic cleaner are described in commonly owned U.S. application Ser. No. 13/745,722, entitled "Mechanism for Cleaning Solar Collector Surfaces" by Grossman et al., filed on Jan. 18, 2013, which is hereby incorporated by reference in its entirety. Furthermore, it is to be understood that the various embodiments shown in the figures are illustrative representations and are not necessarily drawn to scale.

This specification first describes an example robotic cleaner, followed by detailed descriptions of various components of the robotic cleaner followed by example methods of using the cleaner. Various examples are provided throughout.

Turning now to the Figures, FIG. 1 is a schematic illustration of a solar collection system 10, which can be a concentrating or non-concentration (i.e., one sun) system.

The solar collection system 10 can include a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a bearing assembly 20. As such, the torque tubes 16 can be considered as pivots supporting the modules 12.

With continued reference to FIG. 1, the system 10 can also include a tracking system 30 connected to the torque tubes 16 and configured to pivot the torque tube 16 so as to cause the associated collector devices 14 to track the movement of the sun. In the illustrated embodiment, the torque tubes 16 are arranged generally horizontal and the modules 12 are electrically connected to each other. The tracking system can include a single motor and drive components adapted to drive a plurality of parallel torque tube assemblies (e.g., assemblies comprising a series of axially aligned torque tubes connected end-to-end), or a plurality of motors, each connected one or a plurality of axially aligned torque tubes 16.

Optionally, the system 10 can include a plurality of modules 12 supported by torque tubes 16 that are inclined relative to horizontal, wherein the torque tubes 16 are not connected in an end to end fashion. Further, the system can provide for controlled tilting about two axes, although not illustrated herein.

The solar collection devices 14 can be in the form of photovoltaic panels/modules, thermal solar collection devices, concentrated photovoltaic devices, or concentrated thermal solar collection devices.

As described herein, the light receiving surfaces of solar collection devices can accumulate dirt, dust, or other particulates (e.g., airborne particulates) that can block light that would otherwise be incident on the collector surface. Such accumulation can reduce the potential power output of the solar collector(s).

Figure 2:
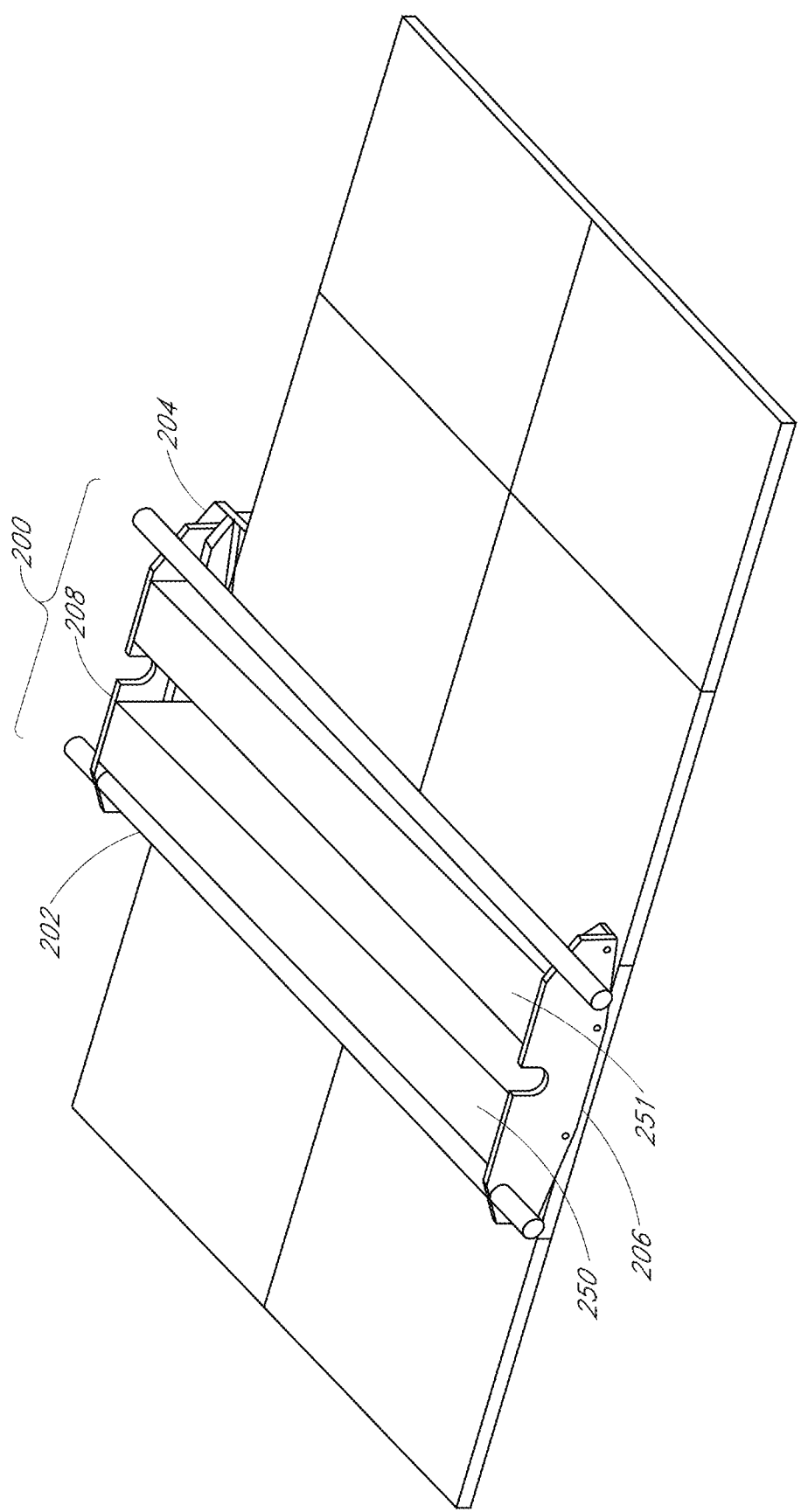
FIG. 2 illustrates an example robotic cleaning device, according to some embodiments.

One way to improve power output is to clean the collector surface of the solar collector. FIG. 2 depicts an example robotic cleaning device for cleaning solar collectors. The robotic cleaning device 200 depicted in FIG. 2 is configured to clean a row of solar collectors by traversing across the collector surface of the array of solar collectors and by crossing gaps between adjacent solar collectors. Although illustrated as covering multiple solar collectors at a time, in some embodiments, the robotic cleaning device can be sized to accommodate a single solar collector at a given time.

The robotic cleaning device 200 can include one or more cleaning modules 250 and 251 for cleaning the collector surfaces of the array of solar collectors. As used herein, the term cleaning module is used interchangeably with the term cleaning head. The cleaning modules can include one or more components for removing accumulated particulate from the collector surface of a solar collector. Example cleaning modules 250 and 251, featuring a dual-squeegee configuration, are discussed in more detail below with respect to FIG. 4. However, in other embodiments, robotic cleaning device 200 may not include a dual-squeegee configuration, such as a zero, one, or more than two squeegee configuration.

Figure 3:
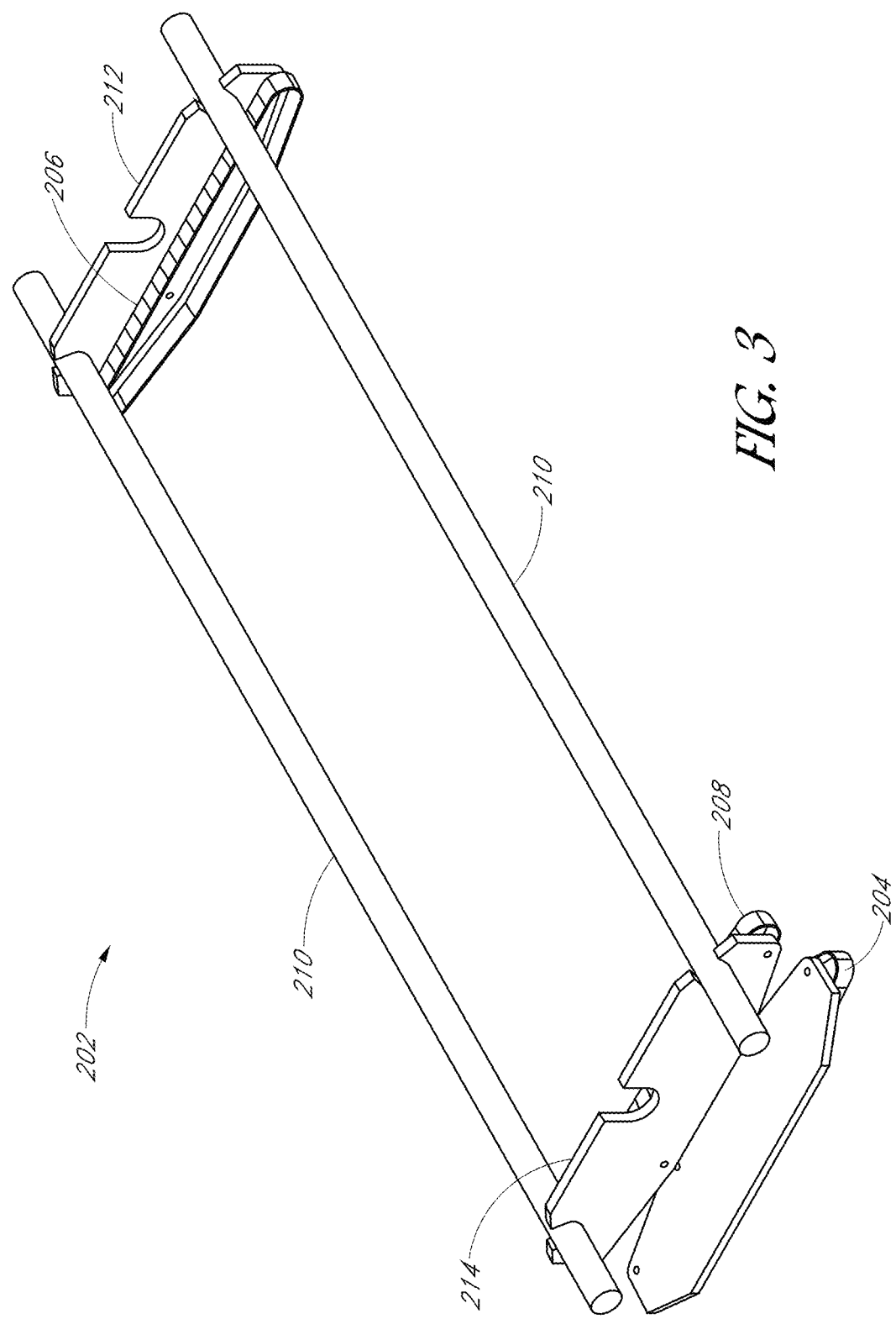
FIG. 3 illustrates an example frame of a robotic cleaning device, according to some embodiments.

As depicted in the examples of FIGS. 2 and 3, the robotic cleaning device 200 can include an upper guide mechanism 204 configured to traverse along an edge (e.g. upper edge when the solar collectors are in a tilted configuration) of the array of solar collectors. In general, the first guide mechanism 204 can inhibit the robotic cleaning device from sliding off the inclined solar collector array and can assist in positioning the robotic cleaning device 200. In this example, the first guide mechanism 204 includes a continuous track belt having a flattened region for contacting the upper edge of an array of solar collectors. The leading and trailing ends of the track belt can be beveled at an angle to assist in transitioning the robotic cleaning device 200 across gaps between solar collectors. In one embodiments, the leading and/or trailing ends of the belt may not be beveled. In some embodiments, the guide mechanism can include a row of rollers (e.g., polyurethane, etc.) having a diameter sufficiently large to roll across gaps between adjacent solar collectors.

In the illustrated embodiment, the upper guide mechanism 204 is mechanically coupled to the frame 202 that supports the components used to clean the collector surface of the solar collector. In this example, the frame 202 is joined to the upper guide mechanism 204 via a pivot joint that allows the frame 202 to rotate with respect to the upper edge of the solar collector. In other embodiments, the upper guide mechanism 204 is rigidly jointed to the frame 202.

In some embodiments, the robotic cleaning device 200 can be positioned along the array of solar collectors using two continuous track mechanisms. The frame 202 can include a front continuous track mechanism 206 disposed at the front, lower edge of the array of solar collectors and a rear continuous track mechanism 208 disposed at the rear, upper edge of the array of solar collectors. Each continuous track mechanism 204, 206, 208 can include an independently controllable drive motor configured to drive a continuous track belt in either direction. The robotic cleaning device 200 can be steered by, for example, driving the two continuous track mechanisms 206, 208 at different speeds with respect to each other. In some cases, drive for the upper guide mechanism 204 is electrically or mechanically coupled to the drive of either the front or rear continuous track mechanisms 206, 208. In some cases, the upper guide mechanism 204 does not include a drive and is a free-rolling mechanism.

As shown in FIG. 2, the continuous track mechanisms 206, 208 can each contact the collector surface via a continuous track belt having a flattened region. In some embodiments, the continuous track mechanisms 206, 208 can also have a beveled lead and trail portions to assist in traversing the gaps between adjacent solar collectors. In particular, the beveled lead and trail portions of the continuous track mechanisms 206, 208 can help convey the robotic cleaning device 200 over gaps between adjacent solar collectors that are at different heights.

The robotic cleaning device 200 can include sensors (e.g., two, four, six, etc.) configured to detect the gap between adjacent solar collectors. The sensors can be used to provide positional feedback for the robotic cleaning device 200. In one embodiment, the sensors are configured to detect gaps between adjacent solar collectors and can also detect the edge of a solar collector array. The sensors can also be used to prevent the robotic cleaning device 200 from driving past the end of the solar collector array and can also be used to reverse direction of movement, as described herein.

In one embodiment, the sensors are used to maintain the orientation of the robotic cleaning device 200 with respect to the array of solar collectors. For example, two optical sensors may be positioned toward the front and rear ends of the frame 202, respectively. Each optical sensor may produce a characteristic response signal when the sensor passes over a gap between adjacent solar collectors indicating a detection of the gap. The timing difference between the front and rear sensor response signals may indicate the orientation of the robotic cleaning device 200 with respect to the array of solar collectors. For example, the robotic cleaning device 200 may be oriented on the array of solar collectors with the lower, front end of the device leading the upper, rear end of the device. In this configuration, the front sensor will detect a gap between adjacent solar collectors before the rear sensor detects the same gap. The timing between the response signals of the two sensors indicates the relative angle of the robotic cleaning device 200 with respect to the array of solar collectors.

The sensors may also be used for purposes other than gap detection. In some implementations, the optical sensor may identify the location of the robotic cleaning device 200 along the array of solar collectors. For example, the optical sensors may detect a location marker or other optical fiducial that represents a known location along the array of solar collectors. The optical sensors may also be used to sense an identification mark on the collector surface indicating a serial number or other form of equipment identification. The sensors may also be used to estimate the quantity of particulate that has accumulated on the collector surface and help determine whether cleaning is necessary and how much cleaning should be performed.

Although much of the preceding description focused on optical sensors, other sensors can also be used including, without limitation, proximity sensors, capacitive sensors, inductive sensors, Hall Effect sensors, limit switches, mechanical sensors, and the like. In some embodiments, the sensors are configured to detect changes in material near the collector surface. For example, the sensor may be configured to detect changes from the glass surface of the collector surface to the metal frame around the collector panel perimeter.

FIG. 3 depicts the frame 202 of robotic cleaning device 200 without the cleaning modules. Note that the orientation of the flame 202 is rotated with respect to the view depicted in FIG. 2. As shown in FIG. 3, the frame includes an upper guide mechanism 204 disposed near the rear portion of the frame 202 for traversing the upper edge of a solar collector array. The frame also includes front and rear continuous track mechanisms 206, 208 disposed near the front and rear ends of the frame 702, respectively.

As shown in FIG. 3, the front and rear continuous track mechanisms 206, 208 are attached to end plates 212, 214. The end plates 212, 214 are structurally joined by two lateral beams 210. The end plates 212, 214 may be attached to the lateral beams 210 by a clamping mechanical interface that allows the plates to be unclamped and moved along the length of the lateral beams 210 to change the distance between the upper and lower continuous track mechanisms 206, 208. In this way, the robotic cleaning device 200 may be configured to fit a variety of differently sized solar collectors.

In some embodiments, the frame 202 may include one or more integrated, onboard liquid reservoirs for storing cleaning liquid (e.g., water) or other liquids used for cleaning the collector surface. For example, one or both lateral beams 210 may be formed from a hollow tube structure that is sealed at both ends to provide a sealed internal cavity. The internal cavity may be used to store the cleaning liquid used in the cleaning operations. In some embodiments, the end plates are also formed from a hollow structure (e.g., a box structure) that is sealed and can also be used as a liquid reservoir.

Figure 4:
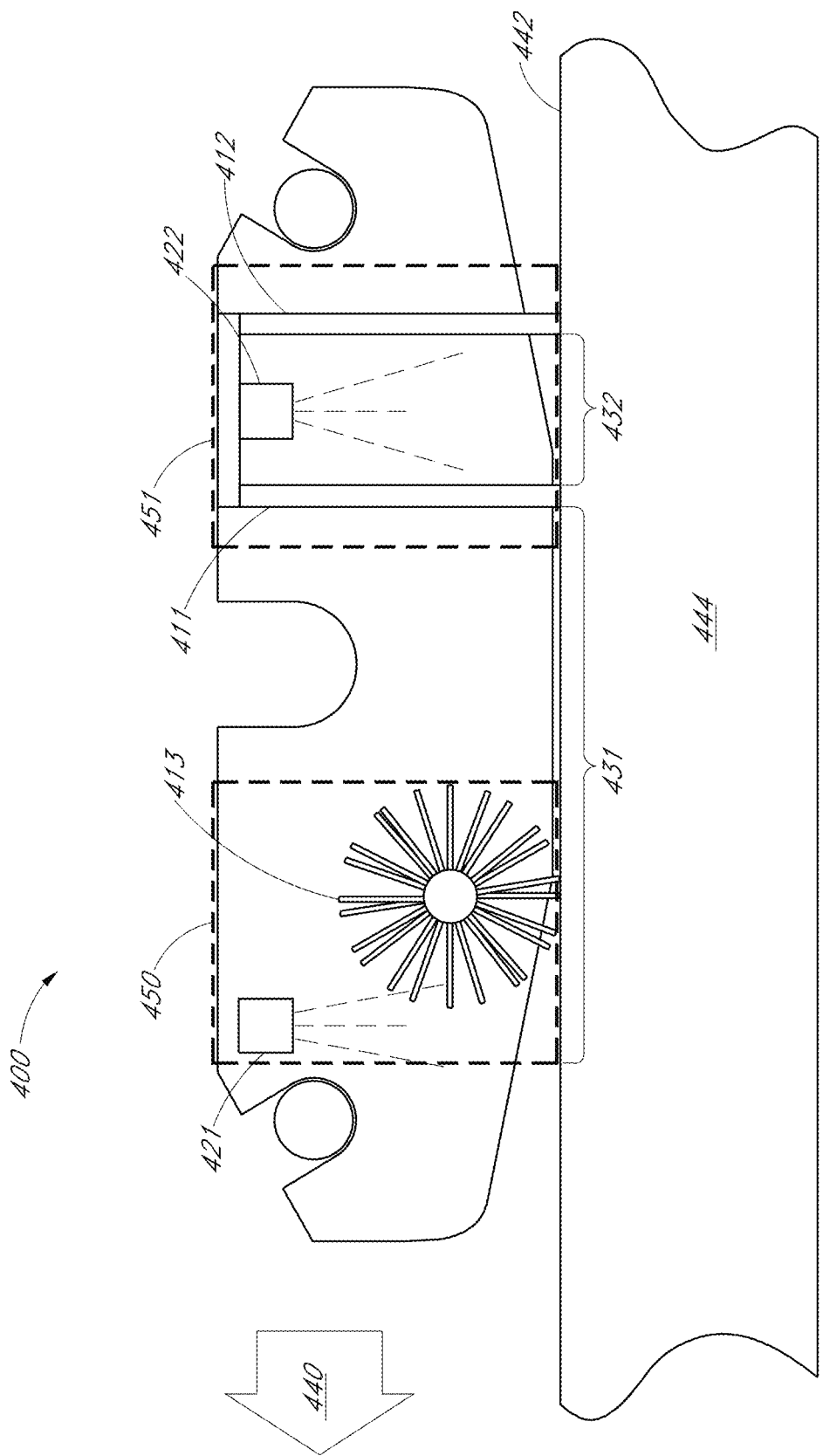
FIGS. 4-5 illustrate schematic diagrams of example cleaning modules for a robotic cleaner, according to one embodiment.

As previously mentioned, a robotic cleaning device can include one or more cleaning modules for cleaning the collector surfaces of the array of solar collectors. FIG. 4 depicts a schematic diagram of example cleaning modules 450 and 451 that can be integrated into the frame of a robotic cleaning device 400.

As shown in FIG. 4, cleaning module 450 includes a brush element 413 and a first liquid-dispensing unit 421. The brush element 413 has a longitudinal side oriented along a first direction substantially perpendicular to the drive direction 440. Cleaning module 451 includes a first squeegee element 411 and a second squeegee element 412 separated by a gap. A second liquid-dispensing unit 422 is disposed in the gap between the first squeegee element 411 and the second squeegee element 412. A cleaning liquid can be applied to the collector surface 442 of the solar collector 444 using the first and/or second liquid-dispensing unit 421, 422.

In this example, as the robotic cleaning device 400 is moved across the collector surface 442 in a drive direction 440, two cleaning areas are created: a low-dilution area 431 and a high-dilution area 432. As shown in FIG. 4, the low-dilution area 431 precedes the high-dilution area 432 as the robotic cleaning device 400 is moved in the drive direction 440. As the robotic cleaning device 400 is driven, the first squeegee element 411 acts as a liquid barrier and separates the low-dilution area 431 from the high-dilution area 432.

As shown in FIG. 4, the low-dilution area 431 corresponds to a portion of the collector surface 442 near the first liquid-dispensing unit 421, a portion of the collector surface 442 under the brush element 413, and extends toward the first squeegee element 411. In some embodiments, the first liquid-dispensing unit 421 delivers a first spray to a dry area of the collector surface 442. After being wetted by the first liquid-dispensing unit 421, the brush element 413 is used to dislodge particulate material that has accumulated on the collector surface 442 of the solar collector 444. As a result, the liquid present in the low-dilution area 431 typically contains a relatively high concentration of particulate material suspended in a volume of cleaning liquid. As the robotic cleaning device 400 is driven across the collector surface 442, a large portion of the cleaning liquid and suspended particulate material are removed by the first squeegee 411.

As shown in FIG. 4, the high-dilution area 432 is located on a side of the first squeegee element 411 opposite to the low-dilution area 431 and includes the area between the first squeegee element 411 and the second squeegee element 412. In a typical implementation, the high-dilution area 432 corresponds to the portion of the collector surface 442 that is being wetted by the cleaning liquid a second time. Accordingly, the cleaning liquid present in the high-dilution area 432 typically contains a lower concentration of particulate suspended in a volume of cleaning liquid as compared to the concentration of suspended particulate in the low-dilution area 431. As the robotic cleaning device 400 is driven across the collector surface 442, nearly all of the liquid and suspended particulate material is removed by the second squeegee element 412. If the solar collector 444 is installed on an incline, the liquid and suspended particulate material removed by the second squeegee element 412 may drain from the high-dilution area 432 by gravity. In some embodiments, the removed liquid may be collected and rerouted back to the first liquid-dispensing units.

As shown in FIG. 4, the brush element 413 may be a rotating brush having bristles extending radially from a central shaft or rod. In some embodiments, the bristles of the rotating brush may be arranged in a helical pattern down the length of the central shaft or rod. The helical arrangement of the bristles may generally push the cleaning liquid on the collector surface 442 toward one end of the robotic cleaning device 400 using an auger motion. If the robotic cleaning device 400 is installed on an inclined solar collector, the helical arrangement of bristles may auger or push the cleaning liquid up the incline as the brush is rotated. This configuration helps prevent the cleaning liquid from draining off the collector surface too quickly and may allow the robotic cleaning device 400 to clean the collector surface using a lower quantity of cleaning liquid.

FIG. 4 depicts one exemplary arrangement of cleaning modules 450 and 451. However, in some embodiments the cleaning modules are integrated into a single cleaning module/head, such as in the example of FIG. 5. Additionally, the cleaning modules may be configured to be manually or automatically lifted from the collector surface 442 to allow the robotic cleaning device 400 to traverse over gaps between adjacent solar collectors, such as PV trackers 1802 and 1804 of FIG. 18, or other obstructions.

As another example, in some embodiments, the robotic cleaning device can be configured to move in a first, reverse direction across a row of PV panels (and optionally apply a pre-soak liquid) with the cleaning module in an up, disengaged position. The robotic cleaning device can be configured to change directions at the end of the row to a second, forward direction. When traversing the row in the forward direction, the robotic cleaning device can be configured to apply the cleaning module in an engaged position. Note that, in one embodiment, even when the cleaning module is disengaged, at least a portion of the cleaning head (e.g., brush 513) may still contact the PV panel(s) to provide a coarse cleaning.

The robotic cleaning device 400 may also be configured for bi-directional operation. For example, a dual-squeegee cleaning module similar to module 451 may be arranged on either side of a brush cleaning module similar to module 450. One of the dual-squeegee cleaning modules may be manually or automatically lifted from the collector surface 442, depending on the direction of travel.

Figure 5:
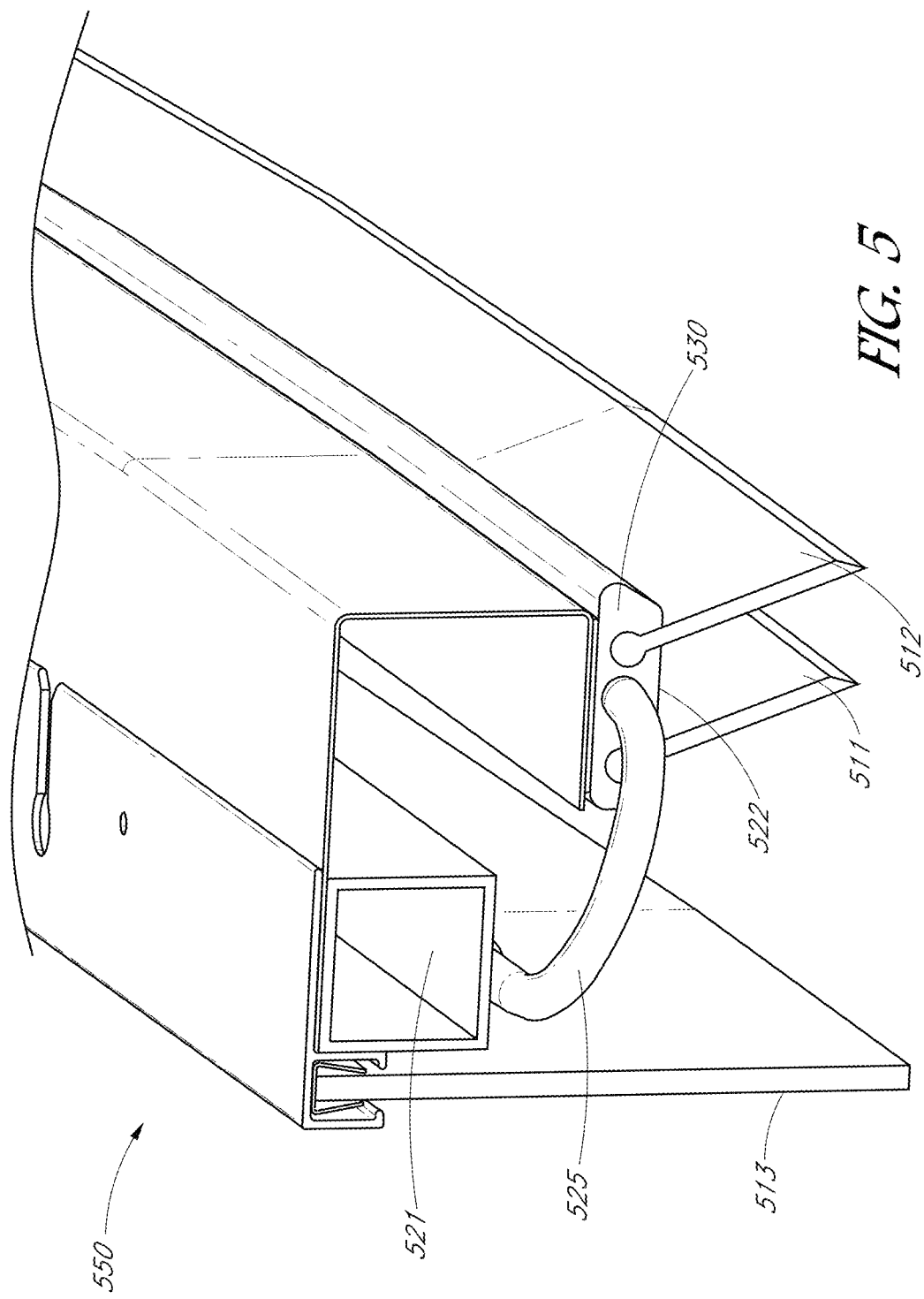

FIG. 5 illustrates another example cleaning module, according to various embodiments, as viewed from above and slightly behind. Note that some or all of the description of cleaning modules 450 and 451 at FIG. 4 can apply to the cleaning module 550 of FIG. 5. In one embodiment, squeegee elements 511 and 512 can be made of silicon or some other rubber. Squeegee elements 511 and 512 can be slideably coupled (as shown) or otherwise coupled to squeegee holder extrusion 530, which can be coupled to a bracket of the cleaning module. In some embodiments, the squeegee holder extrusion can be integrated into the bracket such that the squeegees are directly coupled to the bracket.

Cleaning module 550 can also include a brush element 513, such as a strip brush (as shown) or a rotating brush as in FIG. 4. In various embodiments, brush element 513 can be disposed such that its lowest point is lower than the lowest points of squeegee elements 511 and 512 and therefore makes contact with the PV module even when cleaning module 550 is positioned at a first, higher position (disengaged position) relative to the module without the squeegee elements making contact with the PV module. At a second position (engaged position) of the cleaning module 550 relative to the PV module, both the brush and squeegees can make contact with the PV modules.

Figure 7:
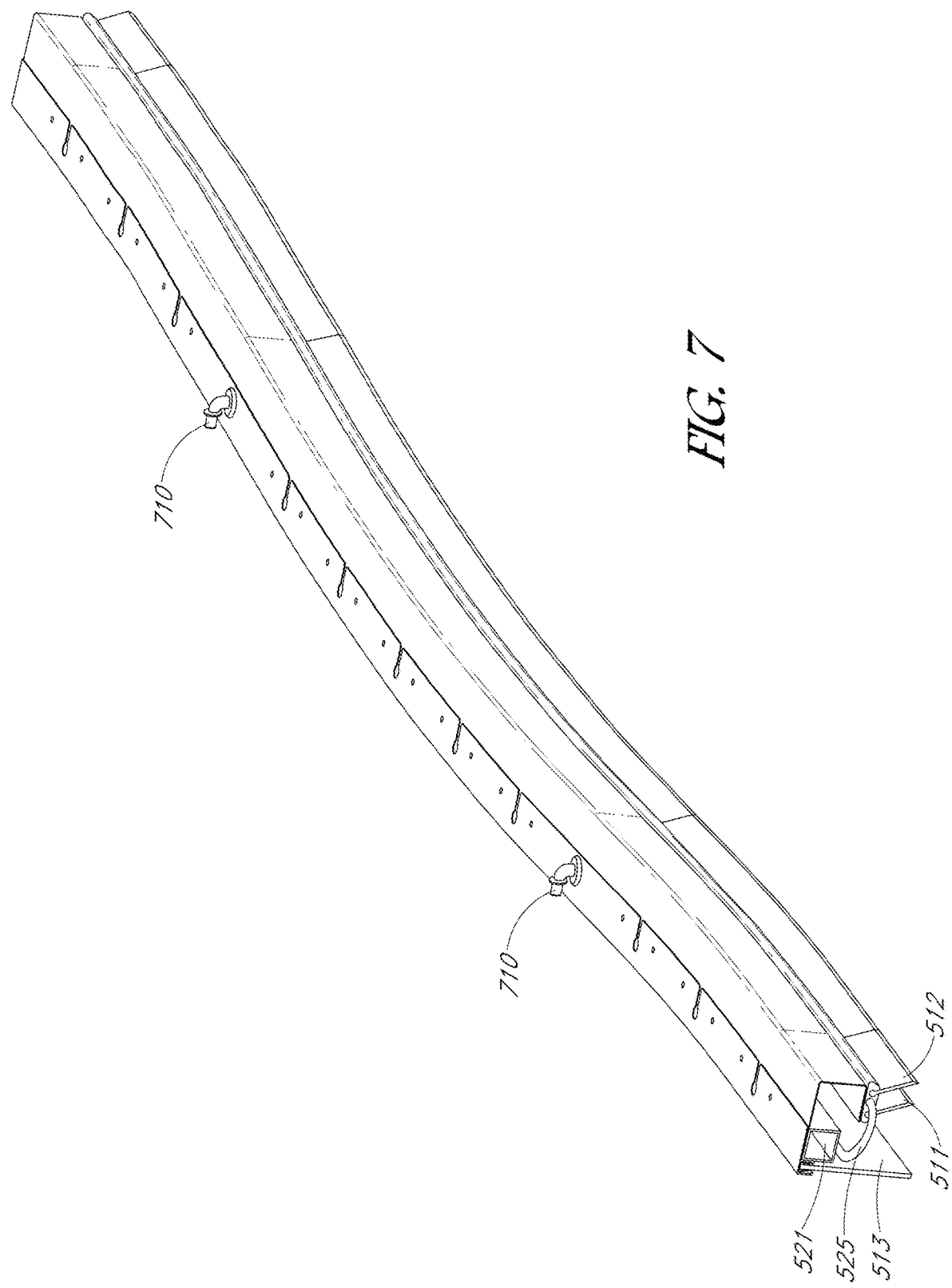
FIGS. 7-8 illustrate example forward curvature cleaning modules for a robotic cleaner, according to one embodiment.

In one embodiment, cleaning module 550 can include water sprayer rail 521 that includes a plurality of holes through which water and/or cleaning solution can be sprayed. Water sprayer rail 521 can be coupled to squeegee holder extrusion via supply line 525 and squeegee holder extrusion 530 can likewise include a plurality of holes through which water and/or cleaning solution can be sprayer. FIG. 7 illustrates ports 710 that can be used to provide water/cleaning solution to cleaning module 550.

In some instances, the top most surface of a PV module may not be flat. For example, the center of the glass section in a typical PV module can sag about 4-5 mm under its own weight when the module is in the horizontal plane. In contrast, the edges of the PV module may not exhibit the same sag as the center resulting in a slightly bowl-shaped module. Embodiments described herein can provide better cleaning for such modules that exist in the field.

In one embodiment, the squeegee(s) can be supple enough to achieve a sufficient line pressure (e.g., approximately 15 Newtons per linear meter) across, the surface of the glass (e.g., in both the middle of the module where it sags and at the edges where it does not sag as much). For example, the spring constant of the squeegee can be low enough that the squeegee deflects more in the high points of the glass and less in the low points but allowing the line pressure to be substantially uniform because the deflection of the squeegee requires little load. The term substantially uniform pressure is used herein to describe a generally consistent line pressure in the middle and edges of the module. The squeegee edge that is in contact with the module surface during operation can include a sharp tip, as shown in the lower edge (glass contacting edge) of squeegee elements 511 and 512. The sharp tip can result in a thinned-out portion of the squeegee that contacts the glass, which can help it conform to the slightly textured module surface.

Figure 6:
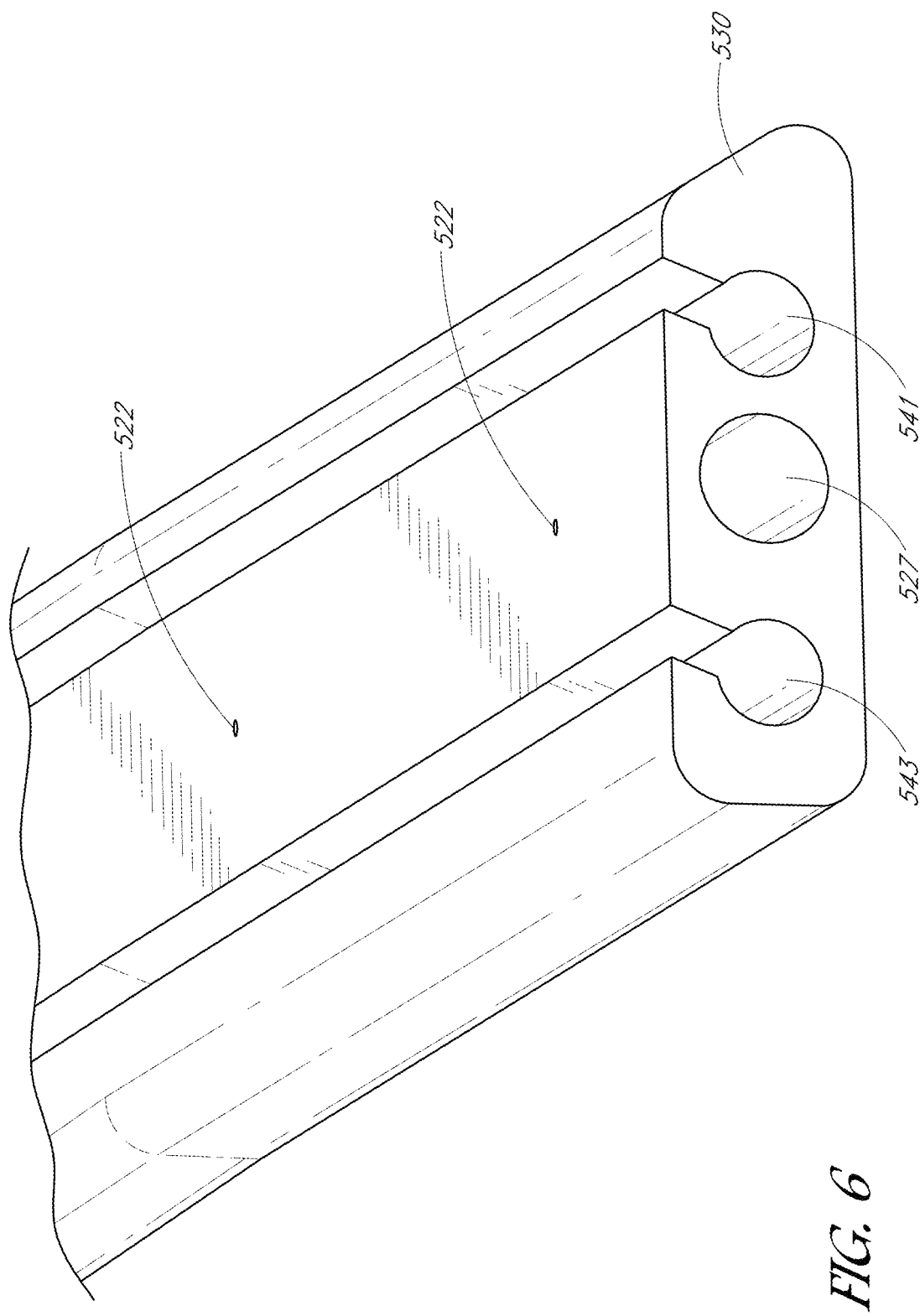
FIG. 6 illustrates a portion of an example cleaning module for a robotic cleaner, according to one embodiment.

As illustrated in FIG. 5 and also in FIG. 6, the squeegees can easily be replaced by sliding a bulb-shaped or otherwise shaped top end of the squeegees out of slots 543 and 541, respectively, of holder 530. In one embodiment, the lead (front) squeegee 511 can exhibit quicker wear such that upon replacement, the older trail (rear) squeegee 512 is moved from slot 541 to 543 and a new squeegee is placed in slot 543.

Figure 8:
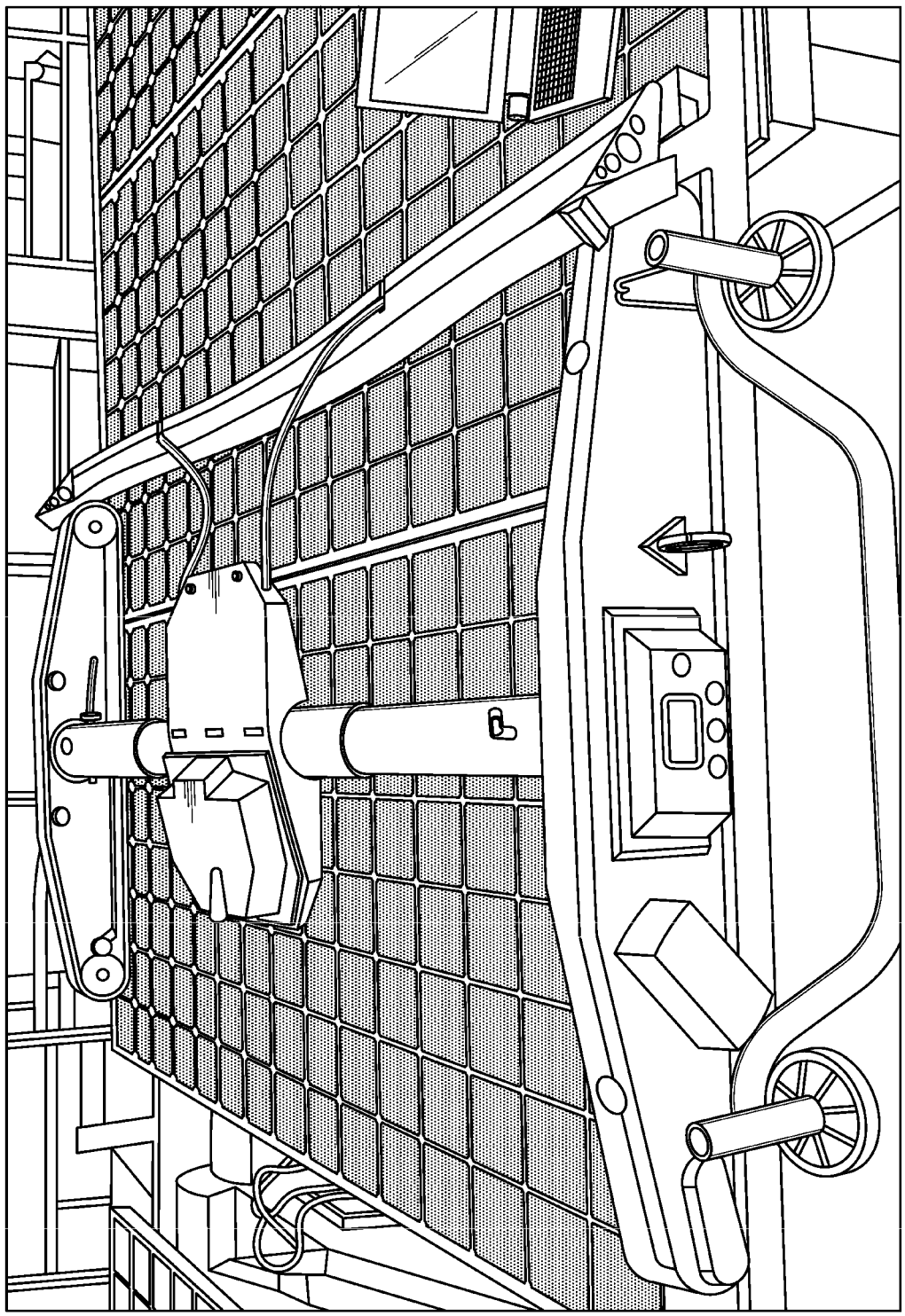

In various embodiments, the curvature of the shape of the cleaning head can also improve cleaning of modules, such as those exhibiting sag. FIGS. 7 and 8 illustrate an example forward curvature of the cleaning head when viewed from above and behind. Forward curvature is used herein to describe a curvature with a middle portion of the cleaning head curved toward the front of the cleaning head (and/or robotic cleaning device) relative to the edge portions of the cleaning head as depicted in FIGS. 7 and 8. The forward curvature of the cleaning head can also provide for similar forward curvature of the brush and squeegee(s), which can allow for the cleaning head, including bristles of the brush, and the squeegees to achieve substantially constant/uniform pressure across the length of the brush despite the sagging middle of the panel. Note that, in one embodiment, as shown in FIG. 8, the cleaning head is only attached to the robotic cleaning device at the ends of the cleaning head and therefore only has direct pressure applied (e.g., by an actuator) at the edges.

Turning to FIG. 8, an example robotic cleaning device with its cover removed is illustrated. As shown, the left side of the depicted robotic cleaning device is its front side and the right side is the rear. The illustrated example includes a cleaning head that is located in the rear of the robotic cleaning device. Similar to the overall cleaning device, the front of the cleaning head as used herein is the left hand side (i.e., the side with the brush) and the right hand side (i.e., the side with the squeegee) is the rear portion or back of the cleaning head. Accordingly, when engaged in cleaning mode, the robot moves toward the left toward the front of the cleaning device such that the brush cleans a particular region of the PV panel before the squeegee does.

Figure 9:
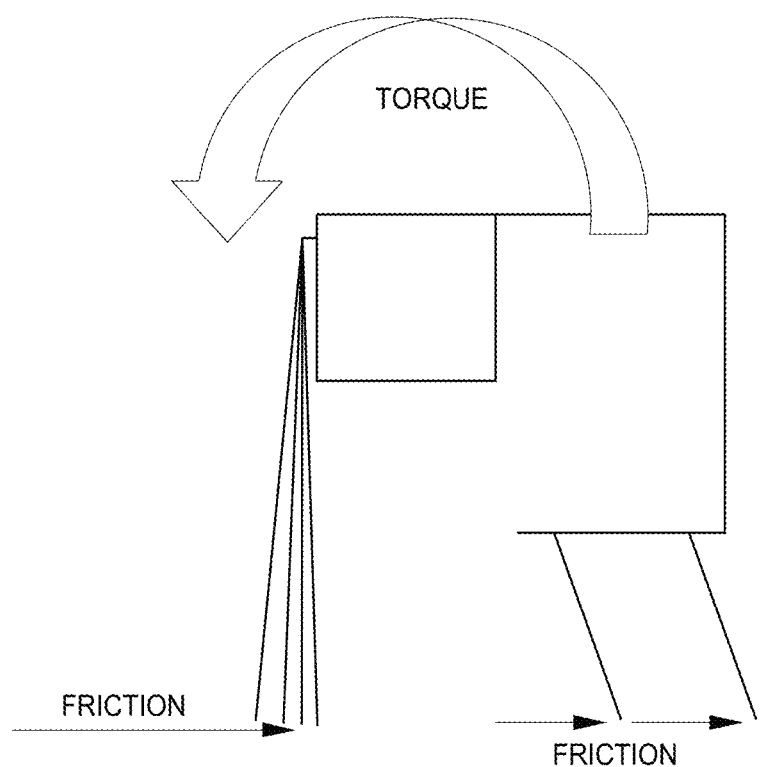
FIG. 9 illustrates a force diagram of a cross-section of an example cleaning head, according to one embodiment.

FIG. 9 illustrates a three diagram of a cross-section of the disclosed curved cleaning head. As shown, when the cleaning head is lowered into position to make contact with the module when the robot is moving forward, the force of the friction between the bristles and the glass surface as well as the squeegees and the glass surface can impart a torque to the cleaning head. The torque can result in a slight rotation counterclockwise as viewed from this angle. The rotation can result in the center section of the brush being slightly lower than the edges of the brush allowing the brush to apply a substantially uniform force down the entire length even though the downward force is only applied at the edges. Thus, the forward curvature of cleaning head can help maintain sufficient pressure to clean the edges as well as the sagging middle of the PV module.

Figure 10:
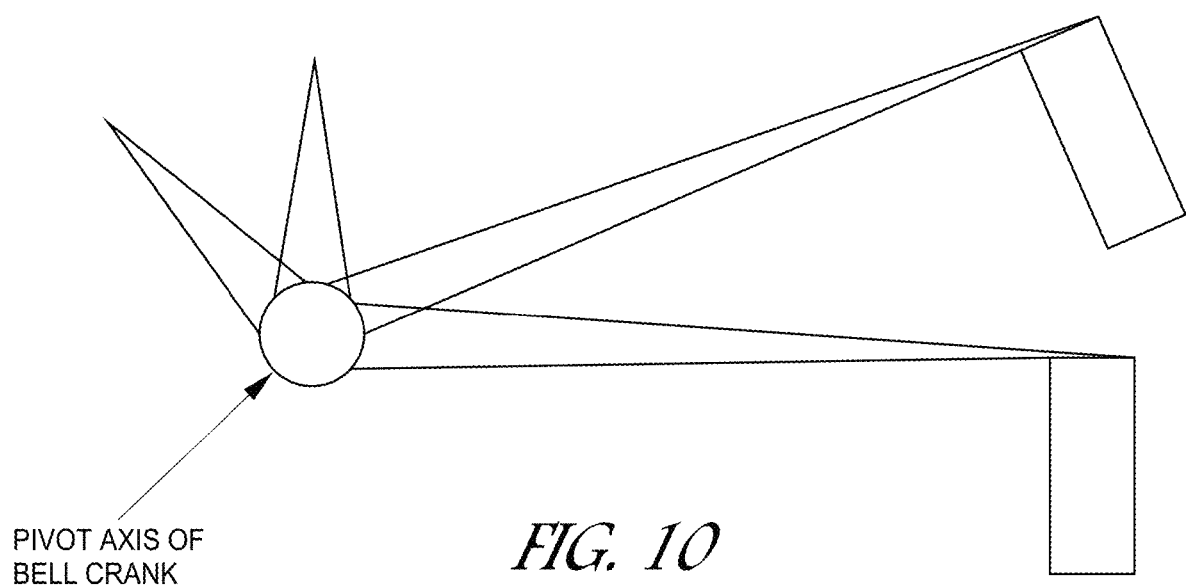
FIG. 10 illustrates a bell-crank actuator, according to some embodiments.

In various embodiments, the squeegees can be sensitive to the angle of incidence with the glass. For example, in some embodiments, squeegees can operate between approximately 20 and 35 off perpendicular. Using a bell-crank actuator to actuate the cleaning head can make achieving such an angle difficult because bell-crank actuators can allow for both translation and rotation, as shown in FIG. 10. In some instances, if the robot pitches forward or backward (e.g., when climbing from one panel to the next if there is a height difference), a bell-crank actuator based cleaning robot may not work because even if it lowers the cleaning head to make contact with the module e.g., as in a step down situation), it has rotated the squeegee out of its normal orientation.

Figure 11:
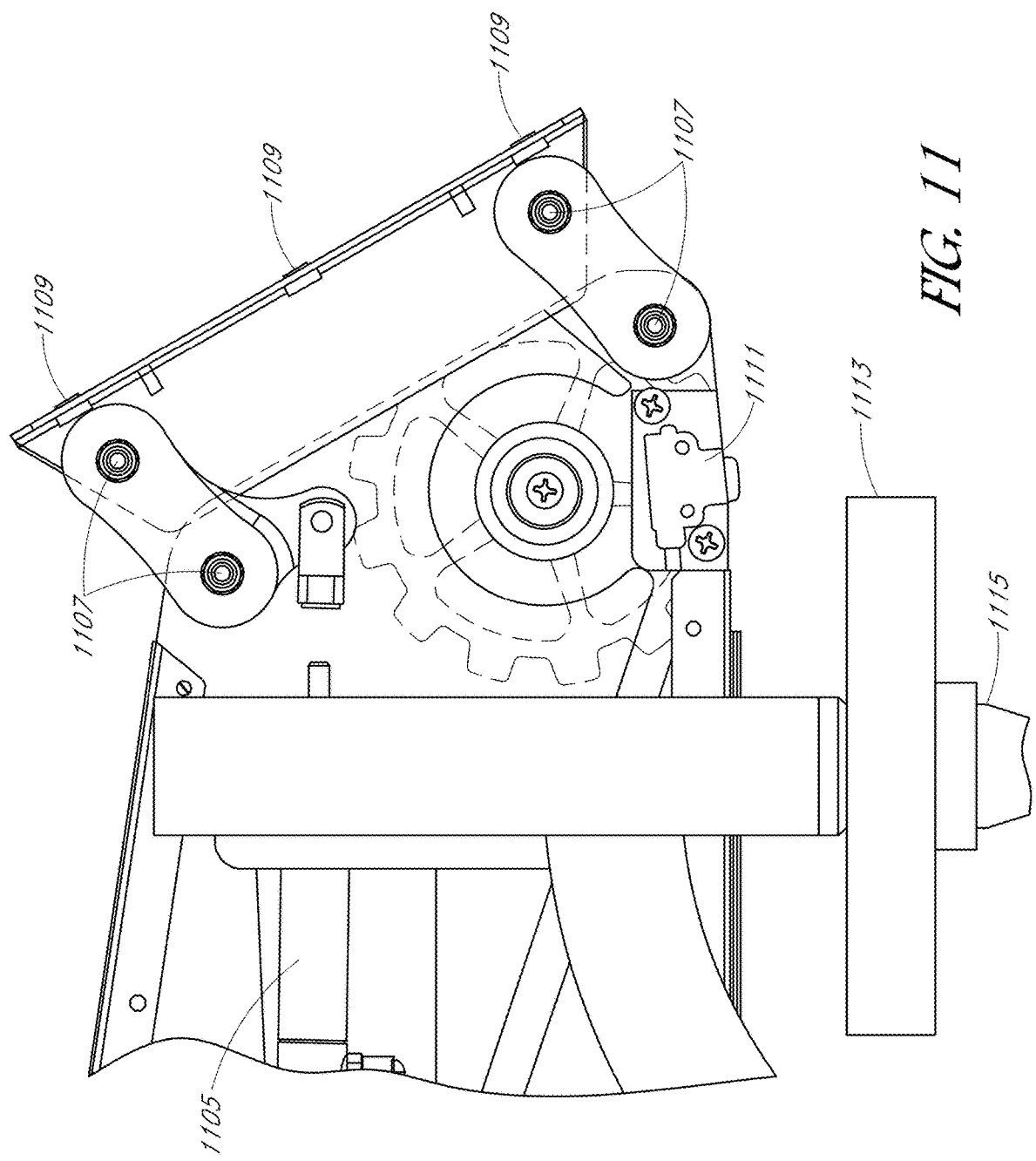
FIGS. 11-12 illustrate cleaning head actuation with translation but without rotation, according to some embodiments.
Figure 12:
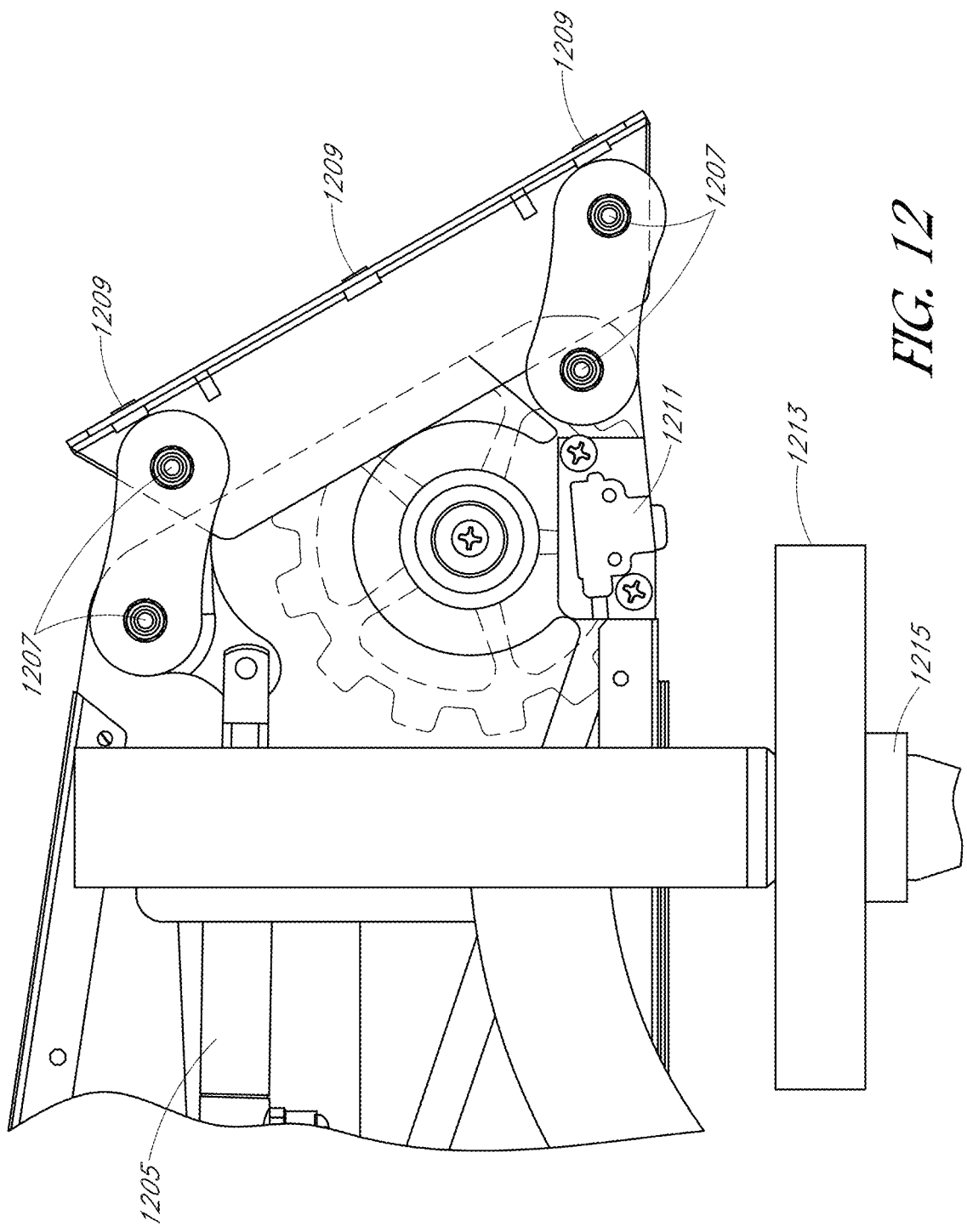

To achieve cleaning head actuation with translation but not rotation, in some embodiments, a parallel linkage mechanism can be used as illustrated at FIGS. 11 and 12. As shown, FIG. 11 illustrates the brush mount bracket of the robotic cleaning device in its up (disengaged) position and FIG. 12 illustrates it in its down (engaged) position. In one embodiment, a pneumatic cylinder 1105/1205 is configured to actuate the cleaning head. As shown between FIGS. 11 and 12, the angle the bracket makes relative to the side of the figure is consistent between the positions shown in FIGS. 11 and 12.

Pivot bolts 1107/1207 can be used as, pivot points for the parallel linkage mechanism and mounting locations 1109/1209 are the points at which the cleaning head is coupled to the actuator. Sensor 1111/1211 can be a proximity sensor (e.g., acoustic sensor, photoelectric sensor, etc.) configured to determine whether a PV module is directly beneath the sensor. Wheel 1113/1213 can be used as a guide to help guide the robotic cleaner over the module. Stacking pin 1115/1215 can be used to stack multiple cleaners together.

Figure 13:
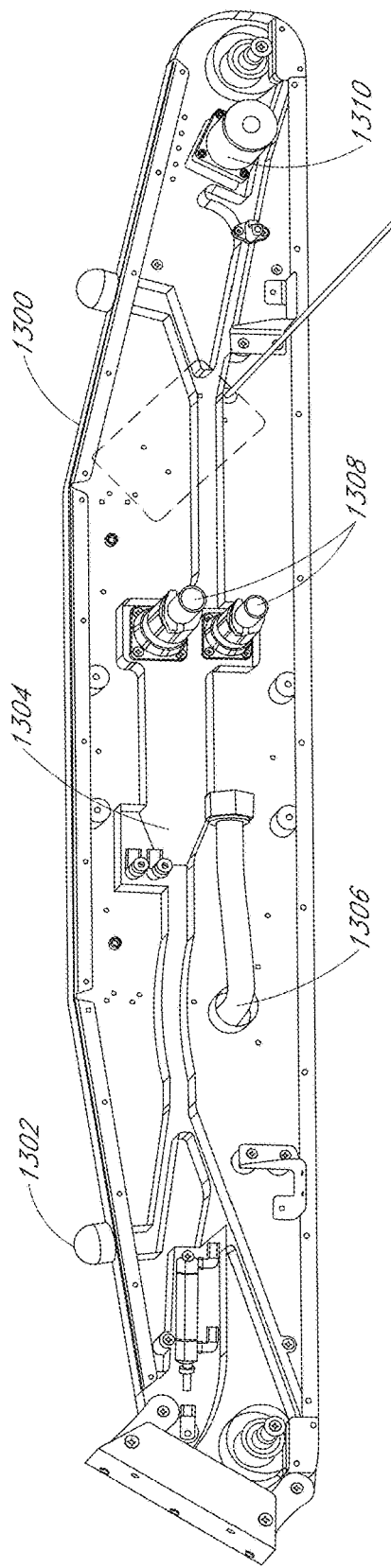
FIGS. 13-15 illustrate example end plates for drive modules of a robotic cleaner, according to some embodiments.
Figure 14:
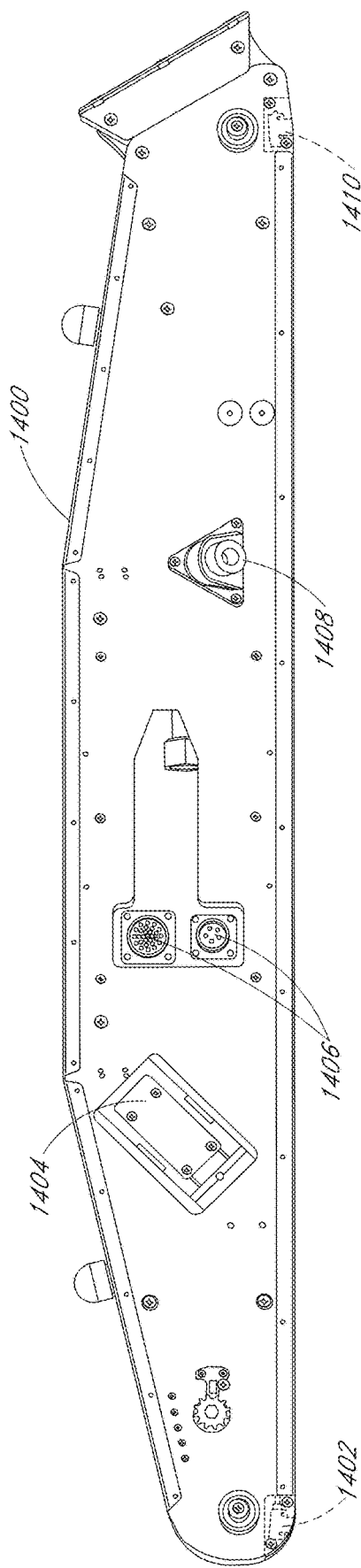
Figure 15:
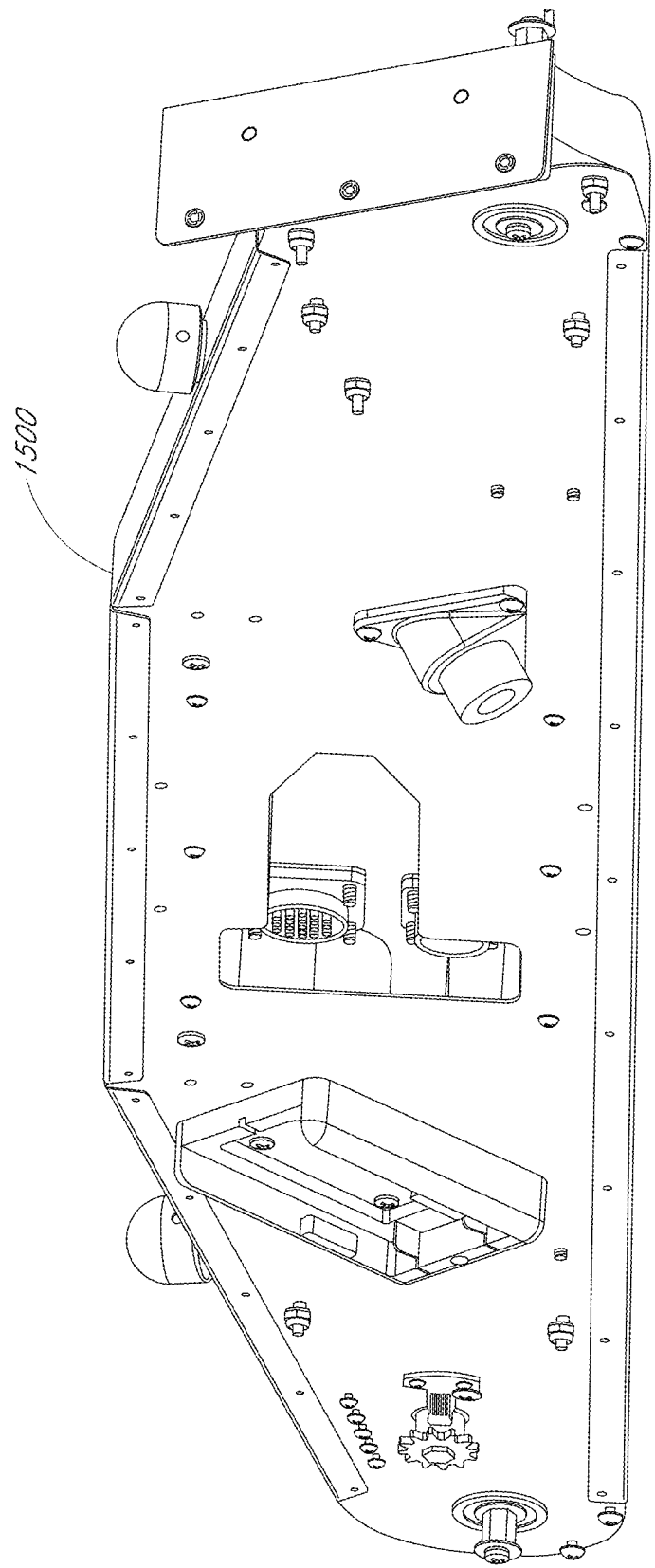

FIGS. 13-15 illustrate example drive modules 1300, 1400, and 1500, according to various embodiments of the cleaner. In some embodiments, a lightweight metal, such as aluminum, foam (e.g., urethane tooling foam), and an injected urethane resign bonded with contact cement can be used to form the end plates. In various embodiments, the foam is routed out in various paths to accommodate routing of wire and hoses (e.g., pneumatic hoses), actuated component(s), sensor(s), and motor(s). FIG. 13 illustrates a transparent view of the aluminum and foam structure of the interior left drive module (right hand side is a mirror of this assembly), showing the anthill like paths with features removed for routing of wire, hose, and internal components. Status light 1302 can be used to provide an indicator of the cleaner's operational status (e.g., low battery, fully operational, low water, out of water, malfunctioning GPS, etc.). As shown, path 1304 can be used to accommodate wiring, tubing, and/or other components. Hose 1306 illustrates a fill hose which comes from the other side of the drive module to a water/solution reservoir. In the illustrated embodiment, ports 1308 can be used to couple drive module electronics to a control board. As illustrated, drive module 1300 also includes at least one drive motor 1310.

FIG. 14 illustrates drive module 1400, which is drive module 1300 as seen from the other side. Sensors 1402 and 1410 can be configured to sense whether the sensors are directly above a portion of a PV module or not (e.g., gap), which can then be used to direct the robotic cleaning device to change directions or correct its course to maintain proper alignment. The end plate of the drive module can also include a battery connector 1404 configured to receive a detachable battery. Ports 1406 illustrate the opposite sides of ports 1308 and water fill port 1408 illustrates a portion of the end plate to which the reservoir can be coupled.

FIG. 15 illustrates end plate 1500 of the drive module with the aluminum layer visible (and hiding the components described at FIGS. 13 and 14).

Figure 16:
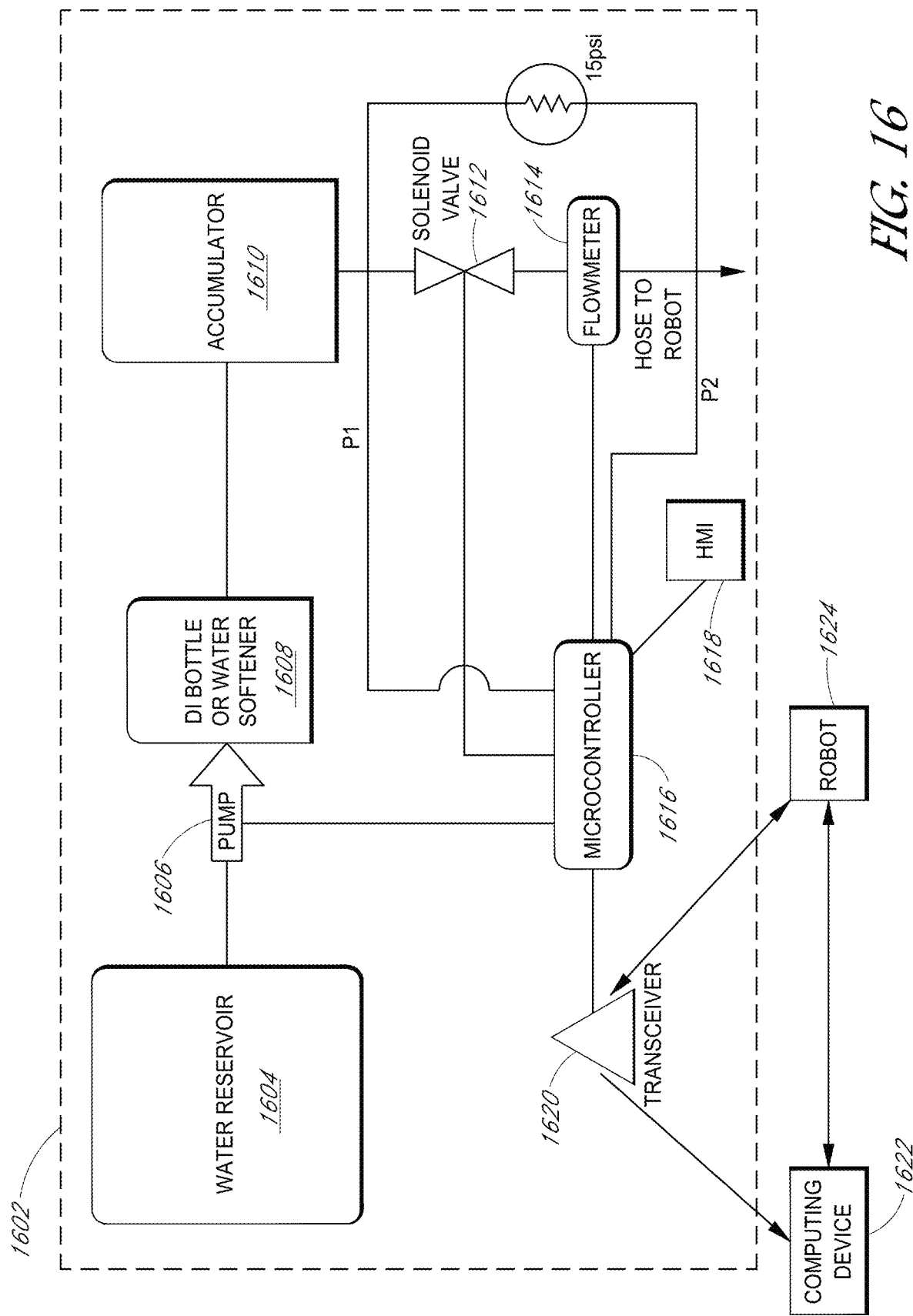
FIG. 16 illustrates an example control system as part of a robotic cleaning system, according to one embodiment.

FIG. 16 illustrates a portion of a robotic cleaning system, including a support system, cleaning robot, and backend. The support system can provide a variety of roles, such as providing a metered fill of the cleaning robot, among other functions.

In one embodiment, the robotic cleaning device can be configured to monitor the current and/or voltage into a positive displacement pump of the robot. Based on the monitored current and/or voltage, the robot can be configured to consistently distribute the appropriate amount of liquid/water (e.g., approximately less than or equal to 0.1 liters per square meter). For example, in one embodiment, the pump can be configured to pump as much water as it can when the robotic cleaning device is moving in the cleaning direction (forward). The robot can slow down or speed up to keep the water per unit area approximately constant (e.g., within 10% of a target water per unit area). In some embodiments, in addition to or instead of slowing down or speeding up to match the pump configuration, the pump can be configured to increase or decrease the amount of liquid dispensed to match the speed of the robotic cleaning device.

In another embodiment, consistent distribution of a particular amount of liquid/water can be implemented in other ways. For example, the robotic cleaning device can include a flowmeter configured to directly measure the flow. Based on that measurement, the robot can speed up, slow down, increase the pump rate, decrease the pump rate, and/or modify its operation otherwise to achieve the particular amount of liquid/water per unit area.

In addition to dispensing a consistent and proper amount of cleaning liquid, the robot can detect if and when the water is out based on the current and/or voltage measurement(s). If the robot is out of water, it can light up or communicate to the support system that it is out of water. The system can flag that that particular row is not completely clean and/or the robotic cleaning device can clean the same row again.

As an alternative to the pump pumping as much water as it can when moving forward, the robotic cleaning device can be configured to operate in a particular cleaning mode, such as light, medium, or heavy soiling modes. Accordingly, the robotic cleaning device can be configured to select a particular cleaning mode based on its own determination of soiling level or it can be instructed to operate in a cleaning mode by the support system (e.g., the microcontroller). As noted above, the pump dispense rate, speed of travel, or both can be configured to achieve a particular amount of liquid per unit area and/or a particular cleaning mode.

As described herein, soiling levels can be determined visually by an operator, by the cleaning robot's sensors, by measuring particulates in rinse water, by measuring leftover water in the onboard reservoir, among other examples.

In one embodiment, the robot can be configured to determine an amount of remaining water, if any, that it has at the completion of cleaning a row of panels. Depending on how quickly the robot runs out of water or how much water remains at the completion of cleaning a row (e.g., by the robot emptying its remaining water and detecting that amount), the robot can communicate with the support system that it needs a particular amount more or less water. In one embodiment, the robot can communicate wirelessly via a transceiver to the support system.

In one embodiment, the support system can include a generator, battery charger(s), and a fill system.

In some embodiments, the fill system can include reservoir 1604 that can store the water/cleaning liquid from which the robot's onboard reservoir is filled. The fill system can also include microcontroller 1616 and pump 1606, which can receive instructions from microcontroller 1616 to pump water to water softener 1608 or D1 resin bottle. From there, the pumped cleaning liquid can be provided to accumulator 1610. Accumulator 1610 can store water at pressure (e.g., ~80 psi) in the system and can permit the use of a smaller pump 1606. In various embodiments, the pressure of the system at accumulator 1610 is approximately 60-80 psi. Microcontroller 1616 can also be coupled to solenoid valve 1612 to open or close the valve. When the hose is connected to the robotic cleaning device to fill the robot's onboard reservoir, the pressure at pressure sensor P2 can drop (e.g., to zero or near zero) and microcontroller 1616 can open solenoid valve 1612 and turn on pump 1606. When the robotic cleaning device's reservoir is nearly filled to the desired fill amount, solenoid valve 1612 can be closed and pump 1606 can be run until pressure in accumulator 1610 is built back up. In one embodiment, a regulator can be used to maintain 15 psi of pressure at the end of the hose when the solenoid valve 1612 is closed to allow for a dry disconnect. Moreover, the regulator can also re-pressurize the line to 15 psi so the microcontroller can detect the next connection of a robotic cleaning device.

The support system can also include a transceiver to communicate with computing device 122 and robotic cleaning device 1624. Various protocols can be used such as Bluetooth, Zigbee, or others. Computing device 122 can communicate with and provide data to a remote server, which can maintain cleaning schedules, maps of PV installation sites, among other data.

In one embodiment, the support system is a modularized system that can be added to a vehicle driven to a solar site.

Consider the following example operation of the robotic cleaning device and support system. In one embodiment, before the robot starts cleaning a particular row of PV modules, the support system can be configured to provide a metered fill of liquid to a the robotic cleaning device's onboard reservoir based on the soiling level of the PV modules. As discussed above, the soiling levels can be determined in a variety of manners. For example, soiling levels can be determined visually by an operator, by the cleaning robot's sensors, by measuring particulates in rinse water, by measuring leftover water in the onboard reservoir, among other examples.

In one embodiment, the support system can receive an indication from the robotic cleaning device, of an amount of water remaining in a reservoir onboard the robotic cleaning device. For example, the robotic cleaning device can measure the amount of liquid remaining and provide that measurement to the support system. In another example, the robotic cleaning device may not make such a measurement itself and can instead discard the remaining amount and the support system can measure the discarded amount. Based on the indication of water remaining, the support system can determine how much water to fill the robot's onboard reservoir with. For example, if a large amount of water remained, the support system can determine that less water than the previous fill should be provided to the robot. If no water remained, the support system can determine to provide a larger fill or same fill amount than the previous fill. The support system can then fill the robotic cleaning device's onboard reservoir with the determined fill amount. Note that because soiling amounts can vary, even within a single solar installation, the fill amount from cleaning pass to cleaning pass can vary. Thus, in a subsequent fill operation, the support system can determine that a different fill amount should be used for the subsequent refill.

As another simple examiner, an operator can simply decide that a particular row was not sufficiently cleaned and may configure the support system to provide a larger than normal fill amount.

In one embodiment, the robotic cleaning device can receive a command, from the support system (e.g., the computing device), to use more or less water per unit area (e.g., low, medium, heavy soiling modes, etc.). In other embodiments, the robotic cleaning device can be configured to use all of its onboard water in a single cleaning pass (e.g., along a row of PV panels) and the amount of water used is based on the amount of water in the onboard reservoir. Therefore, if the support system, operator, or robotic cleaning device indicates that more water is needed, then a larger fill amount will be used and a greater amount of water per square meter will be used.

In various embodiments, the robotic cleaning device can include a GPS receiver into its control board. The GPS can allow the robot to monitor its position. In one embodiment, the GPS locations can be stored in non-volatile memory in the control board. When the robots are within range of the support system's computing device, they can relay their logs (e.g., including an indication of which PV modules have, been cleaned) to the support system computing device. The GPS information can be analyzed to determine which modules at a site have been cleaned and when they have been cleaned.

Figure 17:
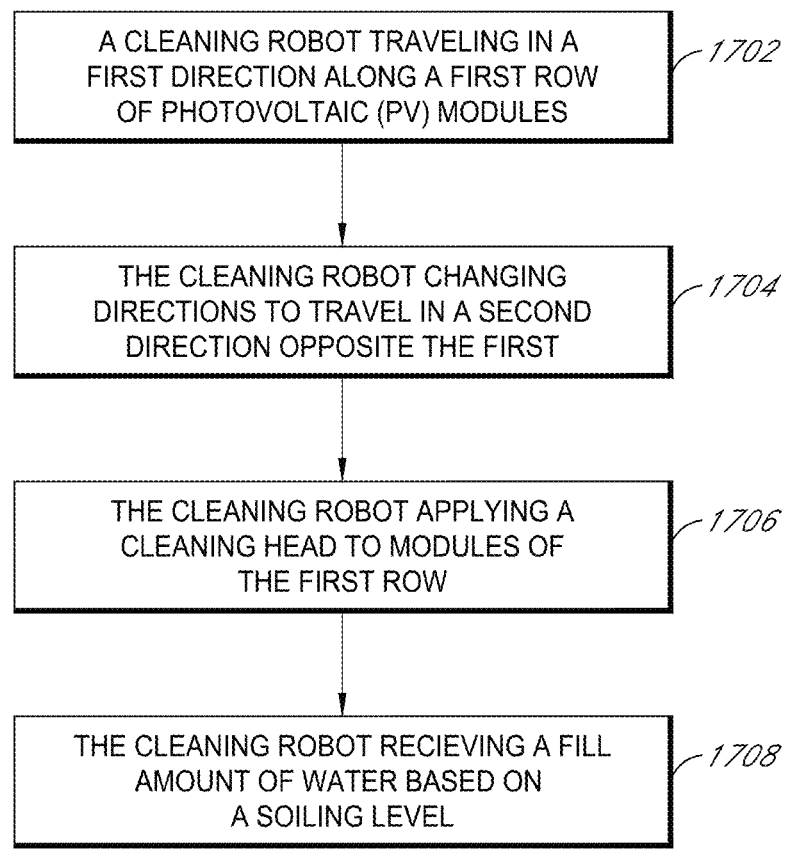
FIG. 17 is a flowchart of an example method for operating a robotic cleaning device, according to some embodiments.

Turning now to FIG. 17, a flow chart illustrating a method for operating a robotic cleaning device is shown, according to some embodiments. In various embodiments, the method of FIG. 17 may include additional (or fewer) blocks than illustrated.

As shown at 1702, a robotic cleaning device can travel in a first (e.g., reverse) direction along a row of PV modules. In some embodiments, a pre-soak can be applied when the robotic cleaning device travels in a reverse direction pass along the PV modules. Using the robotic cleaning device of FIG. 8 as an example, the reverse direction pass can be in a direction toward the squeegee(s) and away from the brush. The cleaning liquid can be sprayed or dripped on the surface of the module during the pre-soak. In some embodiments, as described herein, when the robot is moved in the reverse direction, the cleaning head can be in an up, disengaged configuration. And in one embodiment, the brush can be in contact with the PV module even when the cleaning head is in the up configuration. Thus, in one embodiment, the reverse direction can be a first cleaning pass using the cleaning liquid and brush agitation of the particulates. In other embodiments, the first cleaning pass can be a dry pass with or without brush agitation.

As illustrated at 1704, the robotic cleaning device can change travel directions to a second direction, different than the first. For example, if the first direction was a reverse direction, the second direction can be a forward direction.

As described above, in one embodiment, the robotic cleaning device can be equipped with multiple (e.g., four) downward facing sensors for detecting PV panels below the robot. In one embodiment, four sensors are located in the four corners with two in each drive module. The sensors can provide a logic level voltage to the control board indicative of whether a panel is directly below the sensor. The control board can detect the logic level and changes in the logic level. Changes in the logic level can represent the sensor (e.g., photoeye) passing from the panel to the gap between the panels.

Moreover, the sensors can also be used to determine when the robotic cleaning device should change directions. For example, in some embodiments, the robotic cleaning device moves backwards along the row of PV modules. Once the robotic cleaning device detects the end of the row (and not just a gap between PV modules), such as the end of the row of a tracker, the robotic cleaning device can change directions.

In some embodiments, onboard OPS measurements can be provided to the microcontroller and the microcontroller can instruct the robotic cleaning device to change direction, for example, in embodiments in which the microcontroller has access to OPS coordinates of the PV modules at the site. Or, in another embodiment, the robotic cleaning device can directly use its GPS coordinates in conjunction with the sensor data to determine the end of the row.

At 1706, the robotic cleaning device cart apply the cleaning head to modules of the row. Applying the cleaning head can cause the brush and squeegees to make contact with the PV module. The robotic cleaning device can apply the cleaning head as the robot moves forward along the row. The forward pass can be used as a rinse cycle for improved cleaning in embodiments in which the reverse direction did a brush agitation of particulates or it can serve to do the full cleaning in embodiments in which cleaning is not performed in the reverse direction. As described herein, in some embodiments, the cleaning head of the robotic cleaning device can have a forward curvature such that the cleaning head and the brush and/or squeegees can make substantially uniform pressure on the PV modules, even for sagged PV modules that are common in a PV installation.

As shown at 1708, the robotic cleaning device can receive a metered fill amount of water/cleaning liquid based on a soiling level of the plurality of PV modules. The soiling level can be observed by an operator, sensed by sensors on the robotic cleaning device, or be based on a remaining amount of water in the robotic cleaning device's onboard reservoir, among other examples. Note that the because soiling varies according to PV installation site conditions, the amount used for a metered fill of the robotic cleaning device's onboard reservoir can vary by row, by robotic cleaning device, by location within the PV installation, current weather conditions, etc.

One advantage of the metered fill technique and structure is that it accommodates a wide variety of soiling conditions and row length without wasting a large amount of water. Instead, the system can use a low amount of water, yet clean the PV modules better than other systems.

Note that the methods described herein can be implemented by the various robotic cleaning devices described at FIGS. 2-16 or by other robotic cleaning devices. Accordingly, although the description of FIG. 17 was in the context of a robotic cleaning device with a brush and at least one squeegee, other robotic cleaning devices can operate according to the techniques and methods described herein.

Figure 18:
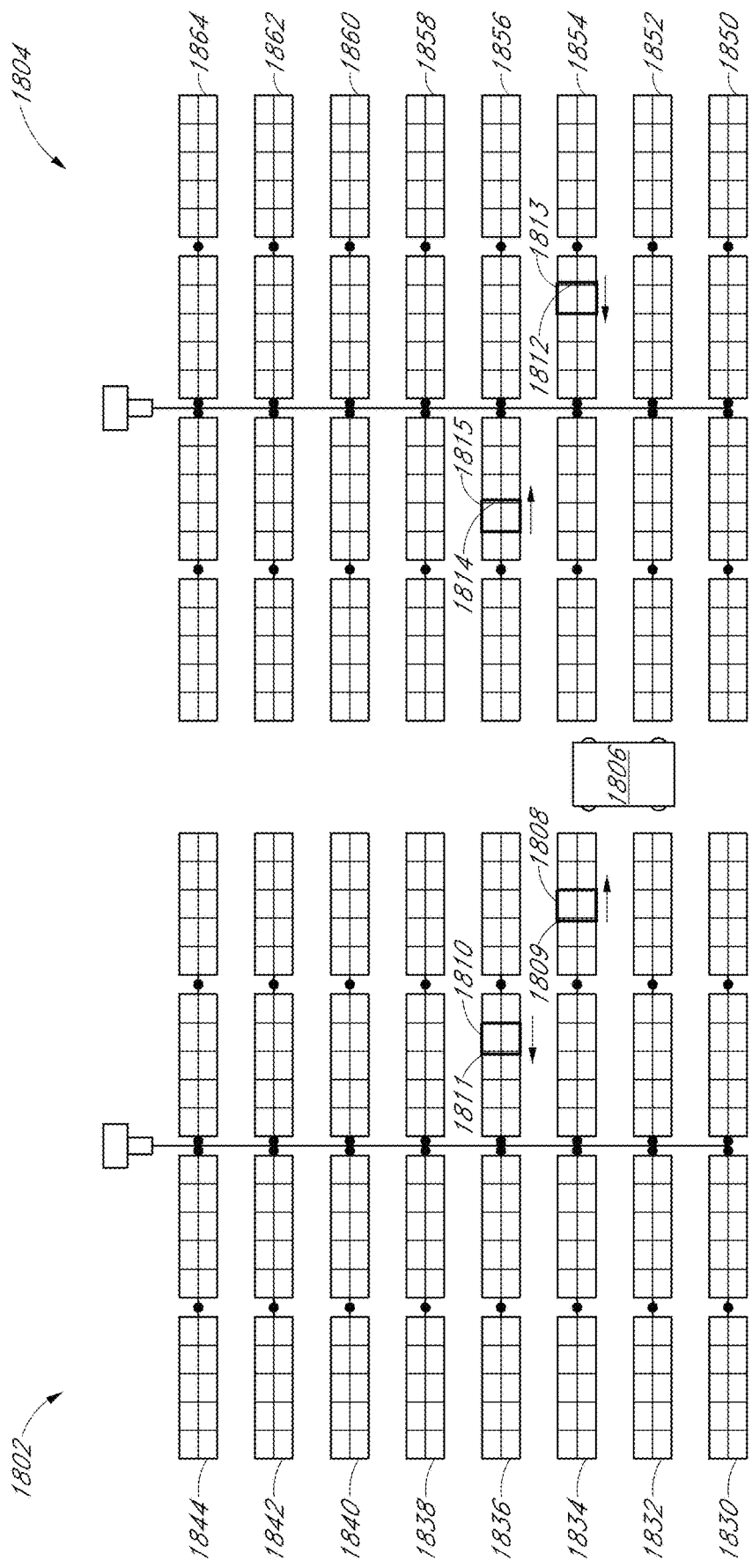
FIG. 18 is a plan view illustrating cleaning a PV installation according to an out-and-back cleaning technique, according to one embodiment.

Turning now to FIG. 18, cleaning a PV installation according to an out-and-back cleaning technique is illustrated, according to one embodiment.

FIG. 18 illustrates a PV installation that includes two PV trackers 1802 and 1804, each similar to that of FIG. 1. For ease of illustration of the example of FIG. 18, much of the description of FIG. 1 is not repeated here but nevertheless applies.

As shown in the example of FIG. 18, PV tracker 1802 includes eight rows, rows 1830, 1832, 1834, 1836, 1838, 1840, 1842, and 1844. Likewise PV tracker 1804 also includes eight rows, rows 1850, 1852, 1854, 1856, 1858, 1860, 1862, and 1864. Support system 1806 is shown between PV trackers 1802 and 1804 positioned near the rows that are being cleaned by robotic cleaning devices 1808, 1810, 1812, and 1814.

Robotic cleaning device 1808 with cleaning head 1809 actuated (actuation not illustrated) is illustrated moving in the "back" direction from left to right (as indicated by the arrow) along row 1834 toward support system 1806.

According to an out-and-back cleaning technique, robotic cleaning device first traveled along row 1834 from right to left with the cleaning head in its up position (the "out" of the out-and-back). Upon reaching the left end of row 1834, robotic cleaning device 1808 changed directions to the direction illustrated and applied its cleaning head while traveling back toward the support system. Upon completion of row 1834, robotic cleaning device 1808 can be serviced (e.g., battery replaced, liquid filled, etc.) and then placed on another row of PV tracker 1804 that has not yet been cleaned, such as row 1838.

Similarly, robotic cleaning device 1810 is illustrated by the arrow as traveling in the "out" direction in row 1836 away from the support system. As described herein, when traveling out, or backwards, the robotic cleaning device can have its cleaning head disengaged until changing directions for the "back" cleaning pass along row 1836. As was the case with robotic cleaning device 1808, upon completion of its row, robotic cleaning device 1810 can be serviced by support system 1806 and then placed on the next open row, such as row 1840 (assuming robotic cleaning device 1808 is on tow 1838 at the time robotic cleaning device 1810 is ready to clean a new row).

The example of FIG. 18 also illustrates two robotic cleaning devices 1812 and 1814 on rows 1854 and 1856 of PV tracker 1804, respectively. The out-and-back technique illustrated by robotic cleaning devices 1808 and 1812 on PV tracker 1802 applies equally with the exception that robotic cleaning devices 1812 and 1814 first travel backwards ("out") left to right with the cleaning head disengaged, followed by returning ("back") to support system 1806 right to left with the cleaning head engaged. Accordingly, the robotic cleaning devices on PV tracker 1804 are oriented 180 degrees from those on PV tracker 1802 to facilitate the different starting side of the respective tracker and different forward cleaning direction (toward the support system in both cases).

Although the example of FIG. 18 illustrates four robotic cleaning devices and a single support system, in other instances, additional robotic cleaning devices and/or support systems can be used. For example, in another implementation, six robotic cleaning devices can be used per support system. For longer rows, additional robots can be used per support system because the robots would spend more time actively traversing a row. Or, if the robots are faster, fewer robots could be used because they will spend less time actively traversing a row.

Moreover, other techniques also apply in addition to the out-and-back technique described FIGS. 17-18. For example, in one embodiment, the robotic cleaning device can operate according to a leapfrog technique in which the robotic cleaning device makes a single pass (e.g., while cleaning in the forward direction) along the row of a tracker, the robotic cleaning device is then optionally serviced (e.g., liquid refilled, battery changed, etc.) and then placed on a row of an adjacent tracker. Using the tracker arrangement of FIG. 18 to further illustrate the leapfrog technique, the robotic cleaning device could be placed on row 1830, clean from left to right in a single pass, then be placed on row 1850 of the adjacent tracker and then clean from left to right in a single pass. If more trackers are present, the robotic cleaning device could proceed along corresponding rows of those other trackers.

Another technique is a snake technique in which the robotic cleaning devices snake from one row of a tracker to the next. For instance, a robotic cleaning device could be placed on the left hand side of row 1830 and clean in a single pass while traversing row 1830 from left to right, the robot can then be placed on the right hand side of row 1832 (and optionally serviced) and clean row 1832 in a single pass while traversing row 1832 from right to left. Accordingly, in the snake technique, the robotic cleaning device can be configured to clean in either the right to left or left to right direction in a single pass depending on the particular row.

One advantage of the out-and-back technique over the leapfrog and snake techniques is that it can enhance cleaning efficiency and reduce cost by utilizing fewer support systems (with less labor cost due to fewer operators).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A robotic cleaning device to clean a surface of a photovoltaic (PV) module, the robotic cleaning device comprising: a curved cleaning head having a length, two opposite ends, and a middle portion that is curved toward a forward direction of travel of the robotic cleaning device relative to edge portions of the curved cleaning head, wherein the curved cleaning head is attached to the robotic cleaning device at each of the opposite ends; and a mechanical actuator that applies the curved cleaning head to the surface of the PV module, wherein travel of the robotic cleaning device in the forward direction creates a forward rotational torque on the curved cleaning head that applies a substantially uniform pressure on the surface of the PV module along the length of the curved cleaning head; wherein the middle portion of the curved cleaning head is disposed ahead of a first end and a second end of the curved cleaning head during movement of the curved cleaning head over the PV module.

2. The robotic cleaning device according to claim 1, wherein the curved cleaning head includes a brush having a middle portion curved toward the forward direction of the robotic cleaning device and the brush applies a substantially uniform pressure on the surface of the PV module along a length of the brush.

3. The robotic cleaning device according to claim 1, wherein the curved cleaning head includes a squeegee having a middle portion curved toward the forward direction of the robotic cleaning device and the squeegee applies a substantially uniform pressure on the surface of the PV module along the length of the squeegee.

4. The robotic cleaning device according to claim 1, wherein the cleaning head is attached to the robotic cleaning device only at ends thereof.

5. The robotic cleaning device according to claim 4, wherein the mechanical actuator applies pressure to the curved cleaning head only at the ends thereof.

6. The robotic cleaning device according to claim 1, wherein a curve of the middle portion of the curved cleaning head is configured to counteract sag in the PV module as the curved cleaning head is moved across a surface of the PV module.

7. The robotic cleaning device according to claim 1, wherein the curved cleaning head includes at least one brush and at least one squeegee.

8. The robotic cleaning device according to claim 7, wherein the at least one brush and the at least one squeegee respectively include middle portions that are curved toward the forward direction of the robotic cleaning device and the at least one brush and at least one squeegee apply a substantially uniform pressure on the surface of the PV module along the length of the at least one brush and at least one squeegee.

9. The robotic cleaning device according to claim 8, wherein the middle portions of the at least one brush and the at least one squeegee are curved to match the curve of the middle portion of the curved cleaning head.

10. The robotic cleaning device according to claim 1, wherein the curved cleaning head includes at least one nozzle to spray a cleaning liquid onto a surface of the PV module.

11. The robotic cleaning device according to claim 1, further comprising:
a plurality of continuous track mechanisms configured to move the robotic cleaning device along a surface of the PV module,
wherein the plurality of continuous track mechanisms includes at least a first continuous track mechanism configured to contact an upper surface of the PV module and a second continuous track mechanism configured to contact a side surface of the PV module.

12. The robotic cleaning device according to claim 11, wherein the first continuous track mechanism and the second continuous track mechanism are located at a first side of the robotic cleaning device.

13. The robotic cleaning device according to claim 12, wherein the plurality of continuous track mechanisms includes a third continuous track mechanism located at a second side of the robotic cleaning device that is opposite the first side.

14. The robotic cleaning device according to claim 1, wherein the mechanical actuator includes at least a pneumatic cylinder to apply the curved cleaning head to the PV module.

15. A photovoltaic (PV) module cleaning device comprising: an elongated and curved cleaning head extending from a first end to a second end that is opposite the first end, the cleaning head curved such that a middle portion of the cleaning head is disposed on one side of the first end and the second end, the cleaning head including one or more of a brush, a squeegee, or a liquid dispenser configured to clean particulates from a surface of a PV module during movement of the cleaning head relative to the PV module; wherein the cleaning head is curved with the middle portion of the cleaning head disposed ahead of the first end and the second end of the cleaning head during movement of the cleaning head over the PV module.

16. The PV module cleaning device of claim 15, wherein the squeegee is a first squeegee and the liquid dispenser is a first liquid dispenser, and the cleaning head includes the first liquid dispenser, the brush, the first squeegee, a second liquid dispenser, and a second squeegee with the brush disposed between the first liquid dispenser and the first squeegee, the first squeegee disposed between the brush and the second liquid dispenser, and the second liquid dispenser disposed between the first squeegee and the second squeegee.

17. The PV module cleaning device of claim 15, wherein the cleaning head includes the brush, and the brush includes bristles in a helical arrangement down a length of the brush.

* * * * *